United States Patent
Xia

(10) Patent No.: US 11,502,919 B2
(45) Date of Patent: Nov. 15, 2022

(54) NETWORK SERVICE MANAGEMENT METHOD, RELATED APPARATUS, AND SYSTEM

(71) Applicant: Huawei Technologies Co., Ltd., Shenzhen (CN)

(72) Inventor: Haitao Xia, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/387,507

(22) Filed: Jul. 28, 2021

(65) Prior Publication Data

US 2021/0359919 A1 Nov. 18, 2021

Related U.S. Application Data

(63) Continuation of application No. 16/910,317, filed on Jun. 24, 2020, now Pat. No. 11,108,653, which is a (Continued)

(51) Int. Cl.
*G06F 15/16* (2006.01)
*G06F 9/54* (2006.01)
(Continued)

(52) U.S. Cl.
CPC ...... *H04L 41/5041* (2013.01); *G06F 9/45558* (2013.01); *G06F 2009/45595* (2013.01)

(58) Field of Classification Search
CPC ....... H04L 41/5054; G06F 2009/45595; G06F 9/45558
(Continued)

(56) References Cited

U.S. PATENT DOCUMENTS 9,853,869 B1 12/2017 Shaham et al.
10,855,543 B2 * 12/2020 Xia .............. H04L 41/0893
(Continued)

FOREIGN PATENT DOCUMENTS

CN 106856438 A 6/2017
CN 107409063 A 11/2017
(Continued)

OTHER PUBLICATIONS

Huawei, "IFA020 composite NS installation", XP014278816 NFVIFA (16) 000933R2, Sep. 13, 2016, 4 pages.
(Continued)

*Primary Examiner* — Hamza N Algibhah
(74) *Attorney, Agent, or Firm* — Conley Rose, P.C.

(57) ABSTRACT

A network service management method, where the method may include: receiving, by a second network functions virtualization orchestrator (NFVO), a first request sent by a first NFVO; establishing, by the second NFVO, a first connection between the nested network service instance and the composite network service instance and a second connection between the nested network service instance and a member instance in the composite network service instance based on the service access point instance and the information about the service access point instance; and establishing a network connection between the nested network service instance and a member instance in the nested network service instance based on the service access point instance and the information about the service access point instance.

20 Claims, 19 Drawing Sheets

Related U.S. Application Data continuation of application No. PCT/CN2017/119978, filed on Dec. 29, 2017.

(51) Int. Cl.
*H04L 29/06* (2006.01)
*H04L 41/5041* (2022.01)
*G06F 9/455* (2018.01)

(58) Field of Classification Search
USPC .......................................... 709/248
See application file for complete search history.

(56) References Cited

U.S. PATENT DOCUMENTS

| | | | |
|---|---|---|---|
| 10,911,333 B2* | 2/2021 | Xia | .................. H04L 41/28 |
| 2017/0048165 A1 | 2/2017 | Yu et al. | |
| 2014/8029506 | 10/2018 | Xia et al. | |
| 2018/0295067 A1* | 10/2018 | Xia | .................. H04L 47/781 |
| 2019/0273668 A1* | 9/2019 | Xia | .................. H04L 41/0823 |
| 2019/0327621 A1* | 10/2019 | Chou | .................. H04W 24/02 |
| 2019/0349258 A1* | 11/2019 | Xia | .................. H04L 41/5041 |

FOREIGN PATENT DOCUMENTS

| | | | | |
|---|---|---|---|---|
| CN | 103031116 B | 6/2019 | | |
| WO | 2017035735 A1 | 3/2017 | | |
| WO | 2017157708 A1 | 9/2017 | | |
| WO | 2018120222 A1 | 7/2018 | | |
| WO | WO-2018120222 A1 * | 7/2018 | ......... | H04L 12/4641 |
| WO | WO-2018184504 A1 * | 10/2018 | ......... | H04L 41/0889 |

OTHER PUBLICATIONS

Huawei, "IFA020 Bottom-up Installation of a composite NS" XP014279601 NFVIFA (16) 0001275r1, Sep. 13, 2016, 4 pages.
"Network Functions Virtualisation (NFV) Release 3 Management and Orchestration Os-Ma-Nfvo reference point—Application and Service Management Interface and information Model Specification," XP014336392 GS NFV-IFA012 V0.11.0, Sep. 2017, 90 pages.

* cited by examiner

NETWORK SERVICE MANAGEMENT METHOD, RELATED APPARATUS, AND SYSTEM

CROSS-REFERENCE TO RELATED APPLICATIONS

This application is a continuation of U.S. patent application Ser. No. 16/910,317, filed on Jun. 24, 2020, which is a continuation of International Patent Application No. PCT/CN2017/119978, filed on Dec. 29, 2017. All of the aforementioned patent applications are hereby incorporated by reference in their entireties.

TECHNICAL FIELD

This application relates to the field of cloud computing technologies, and in particular, to a network service management method, a related apparatus, and a system.

BACKGROUND

Network functions virtualization (NFV) is a technology in which a telecommunications network operator uses a virtualization technology in the information technology (IT) field to perform software-hardware decoupling for implementing some telecommunications network functions in a universal server, switch, and memory, so as to rapidly and efficiently deploy a network service (NS), and reduce investment costs (e.g., capital expense (CAPEX)) and operation costs (e.g., operating expense (OPEX)). In this technology, the telecommunications network function needs to be implemented by software, can be run on hardware of the universal server, and can be migrated, instantiated, and deployed at different physical locations of a network as required, and no new device needs to be installed.

In NFV, a virtualized network service (NS) may be, for example, an Internet Protocol (IP) Multimedia Subsystem (IMS) or an evolved packet core (EPC) service. One NS may include one or more virtualized network functions (VNFs). The VNF is software implementation of a network function that can be deployed on an NFV infrastructure. When an NS is deployed, a service request apparatus, such as an operations support system and business support system (OSS/BSS), needs to provide an apparatus, such as an NFV orchestrator (NFVO), for a service and provide an NS descriptor (NSD). The NS descriptor mainly describes a topology structure of the NS and a descriptor for each member instance included in the NS. In the topology structure, a virtual link (VL) is used to describe a connection between member instances.

Currently, NFV standardization mainly focuses on dynamic management and orchestration (MANO) of VNFs and virtualized resources. Functions in a MANO framework are formulated by the NFV interface and architecture (IFA) working group of the European Communications Standards Institute (ETSI). A MANO function architecture is shown in FIG. 1.

(1) NFV orchestrator (NFVO): The NFVO mainly manages and processes a network service descriptor (NSD) and a virtualized network function forwarding graph (VNFFG), performs life cycle management for a network service, and cooperates with a VNF manager (VNFM) to perform life cycle management for a VNF and implement a global view function for virtualized resources. In addition, the NFVO may further communicate with a virtualized infrastructure manager (VIM), to allocate and/or reserve a virtualized resource, and exchange configuration and status information of the virtualized resource.

(2) VNF manager (VNFM): The VNFM performs life cycle management for the virtualized network function VNF, where the life cycle management includes virtualized network function descriptor (VNFD) management, VNF instantiation, VNF instance scaling (including scaling out/up and scaling in/down), VNF instance healing, and VNF instance termination. The VNFM can further receive a scaling policy delivered by the NFVO, to implement VNF auto scaling.

(3) Virtualized infrastructure manager (VIM): The VIM is mainly responsible for managing (including reserving and allocating) a hardware resource and a virtualized resource at an infrastructure layer, monitoring a status of the virtualized resource, reporting a fault, and providing a virtualized resource pool for an upper-layer application.

(5) Operations support system and business support system (OSS/BSS): The OSS/BSS supports various end-to-end teleservices, and mainly refers to an existing operations support system and business support system OSS/BSS of an operator. The OSS/BSS may load the NSD onto the NFVO and initiate an NS instantiation request to the NFVO.

(6) Element management system (or element manager (EM)): The EM performs a conventional fault, configuration, user, performance, and security management (fault management, configuration management, accounting management, performance management, security management (FCAPS)) function for the VNF.

(7) Virtualized network function (VNF): The VNF is equivalent to a physical network function (PNF) in a conventional non-virtualized network, and for example, is a virtualized EPC node (a mobility management entity (MME), a serving gateway (SGW), a packet gateway (PGW), or the like). Functional behavior and a status of a network function are unrelated to virtualization. In an NFV technology, it is expected that the VNF and the PNF have same functional behavior and same external interfaces.

The VNF may include a plurality of lower-level VNF components (VNFCs). Therefore, one VNF may be deployed on a plurality of virtual machines (VMs), and each VM carries a function of one VNF component. Alternatively, the VNF may be deployed on one VM.

(8) NFV infrastructure (NFVI): The NFVI includes a hardware resource, a virtualized resource, and a virtualization layer. From the perspective of the VNF, the virtualization layer and the hardware resource constitute an entity that can provide a required virtualized resource.

In a scenario in which a network service is provided across a plurality of administrative domains (multiple administrative domains), if all of member VNF instances and nested NS instances in a composite NS instance are available, a consumer NFVO connects the member VNF instances to the nested NS instances in the composite NS instance. However, a virtual link (VL) information model defined in an existing ETSI NFV standard is designed merely from the perspective that the consumer NFVO performs network connection.

SUMMARY

This application provides a network service management method, a related apparatus, and a system. A virtual link information model is defined from the perspective of a nested network service instance. This can meet a requirement for establishing a network connection from the perspective of the nested network service instance.

According to a first aspect, this application provides a network service management method, applied to a first NFVO (that is, a consumer NFVO) side. The method may include: sending, by a first NFVO, a first request to a second NFVO, where the first request may be used to request to create a nested NS instance in a composite NS instance. The first request carries information (that is, service access point (SAP) information (SapInfo)) about a SAP instance associated with the nested NS instance. The SapInfo may be used by the second NFVO to establish, based on the SAP instance, a connection between the nested NS instance and the composite NS instance and a connection between the nested NS instance and a member instance in the composite NS instance, and is further used by the second NFVO to establish, based on the SAP instance, a connection relationship to a member instance in the nested NS instance.

According to a second aspect, this application provides a network service management method, applied to a second NFVO (that is, a provider NFVO) side. The method may include: receiving, by a second NFVO, a first request sent by a first NFVO, where the first request may be used to request to create a nested NS instance in a composite NS instance. The first request carries information (that is, SapInfo) about a SAP instance associated with the nested NS instance. The SapInfo may be used by the second NFVO to establish, based on the SAP instance, a connection between the nested NS instance and the composite NS instance and a connection between the nested NS instance and a member instance in the composite NS instance, and is further used by the second NFVO to establish, based on the SAP instance, a connection relationship to a member instance in the nested NS instance. Then, the second NFVO establishes, based on the SAP instance and the SapInfo, the connection between the nested NS instance and the composite NS instance and the connection between the nested NS instance and the member instance in the composite NS instance, and establishes, based on the SAP instance and the SapInfo, the connection relationship to the member instance in the nested NS instance.

It may be understood that, by implementing the methods described in the first aspect and the second aspect, the SapInfo is carried in a request (namely, the first request) used to create the nested NS instance, and the provider NFVO may be indicated to establish external and internal network connections of the nested NS instance based on the SapInfo from the perspective of the nested NS instance. This can meet a requirement for establishing a network connection from the perspective of the nested NS.

With reference to the first aspect or the second aspect, the following describes implementation of the SapInfo in this application.

In this application, the SapInfo may include two parts: first information and second information. The first information is used to describe an external virtual link information model, and may be used by the second NFVO to establish a connection between the nested NS instance and the member instance that is in the composite NS instance that is (externally) connected to the nested NS instance through the SAP instance. The second information is used to describe an internal virtual link information model, and may be used by the second NFVO to establish a connection between the nested NS instance and the member instance that is in the nested NS instance and that is (internally) connected to the nested NS instance through the SAP instance.

In this application, the first information may include an identifier of an external virtual link instance, an identifier of a port through which the SAP instance is connected to the external virtual link instance, and an identifier of a peer connection point connected to the SAP instance through the external virtual link instance. The peer connection point connected to the SAP instance through the external virtual link instance may be an external connection point that is of the member instance in the composite network service instance and that is connected to the SAP instance through the external virtual link instance, for example, an external connection point VnfExtCp of a VNF instance, an external connection point PnfExtCp of a PNF instance, or a service access point (SAP) of another nested NS instance. The peer connection point connected to the SAP instance through the external virtual link instance may alternatively be a SAP of the composite NS instance.

In this application, the second information may include an identifier of an internal virtual link instance, a port through which the SAP instance is connected to the internal virtual link instance, and an identifier of a peer connection point connected to the SAP instance through the internal virtual link instance. The peer connection point connected to the SAP instance through the internal virtual link instance may be an external connection point that is of the member instance in the nested network service instance and that is connected to the SAP instance through the internal virtual link instance, for example, an external connection point VnfExtCp of a VNF instance, an external connection point PnfExtCp of a PNF instance, or a SAP of a sub-nested NS instance.

Information about the peer connection point may not be reflected in the internal virtual link information model, to ensure information isolation between different administrative domains. To be more specific, the second information may alternatively include an identifier of a second virtual link instance and a port through which the SAP instance is connected to the internal virtual link instance, and does not include an identifier of a peer connection point connected to the SAP instance through the internal virtual link instance. In other words, an internal peer connection point that is internally connected to the nested NS instance through the SAP instance is invisible to the outside (that is, the composite NS instance and another member instance in the composite NS instance).

With reference to the first aspect or the second aspect, in some embodiments, as soon as all member instances in the composite NS instance are available, the second NFVO that manages the nested NS may establish, based on the virtual link information model, connections indicated by a virtual link information model.

1. In this application, the second NFVO may establish, based on the SAP instance of the nested NS instance, connections indicated by the external virtual link information model in at least one of the following manners.

Manner 1: The second NFVO establishes, based on the first information in the SapInfo, a connection between the SAP instance and a SAP instance that is of the composite NS instance and that is externally connected to the SAP instance through the external virtual link instance.

Manner 2: The second NFVO establishes, based on the first information in the SapInfo, a connection between the SAP instance and a SAP instance that is of the other nested NS instance in the composite NS instance and that is externally connected to the SAP instance through the external virtual link instance.

Manner 3: The second NFVO establishes, based on the first information in the SapInfo, a connection between the SAP instance and the external connection point that is of the VNF instance in the composite NS instance and that is externally connected to the SAP instance through the external virtual link instance.

Manner 4: The second NFVO establishes, based on the first information in the SapInfo, a connection between the SAP instance and the external connection point that is of the PNF instance in the composite NS instance and that is externally connected to the SAP instance through the external virtual link instance.

2. In this application, the second NFVO may establish, based on the SAP instance of the nested NS instance, connections indicated by the internal virtual link information model in at least one of the following manners.

Manner 1: The second NFVO establishes, based on the second information in the SapInfo, a connection between the SAP instance and a SAP instance that is of the sub-nested NS instance in the nested NS instance and that is internally connected to the SAP instance through the internal virtual link instance.

Manner 2: The second NFVO establishes, based on the second information in the SapInfo, a connection between the SAP instance and the external connection point that is of the VNF instance in the nested NS instance and that is internally connected to the SAP instance through the internal virtual link instance.

Manner 3: The second NFVO establishes, based on the second information in the SapInfo, a connection between the SAP instance and the external connection point that is of the PNF instance in the nested NS instance and that is internally connected to the SAP instance through the internal virtual link instance.

With reference to the first aspect or the second aspect, in some embodiments, the first NFVO may send a second request to the second NFVO. For example, the second request may be used to request to update the nested NS instance in the composite NS instance. For another example, the second request may carry the SapInfo associated with the nested NS instance. Correspondingly, the second NFVO receives the second request sent by the first NFVO. The second NFVO may update, based on the SapInfo that is associated with the nested NS instance and that is carried in the second request, the connection between the nested NS instance and the composite NS instance that is externally connected to the nested NS instance based on the SAP instance and the connection between the nested NS instance and the member instance that is in the composite NS instance and that is externally connected to the nested NS instance based on the SAP instance, or update the connection between the nested NS instance and the member instance that is in the nested NS instance and that is internally connected to the nested NS instance based on the SAP instance.

Herein, the SapInfo is used to describe a virtual link information model associated with the SAP instance, and may be used by the second NFVO to update network connections associated with the nested NS instance. To be more specific, the SapInfo may be used to update the connection between the nested NS instance and the composite NS instance that is externally connected to the nested NS instance based on the SAP instance and the connection between the nested NS instance and the member instance that is in the composite NS instance and that is externally connected to the nested NS instance based on the SAP instance. Alternatively, the SapInfo may be used to update the connection between the nested NS instance and the member instance that is in the nested NS instance and that is internally connected to the nested NS instance based on the SAP instance.

For example, the updating network connections associated with the nested NS instance may include at least one of the following: establishing a new network connection associated with the nested NS instance, modifying an existing network connection associated with the nested NS instance, or removing an existing network connection associated with the nested NS instance.

It may be understood that, the SapInfo is carried in a request (namely, the second request) used to update the nested NS instance, and the provider NFVO may be indicated to update external and internal network connections of the nested NS instance based on the SapInfo from the perspective of the nested NS instance. This can better meet a requirement for updating a network connection from the perspective of a nested NS.

With reference to the first aspect or the second aspect, in some embodiments, the first NFVO may send a third request to the second NFVO. For example, the third request may be used to request to use an existing nested NS instance managed by the second NFVO. The third request carries information about a SAP instance that is of the existing nested NS instance and that is newly added in the composite NS instance managed by the first NFVO. The information about the newly added SAP instance may be used by the second NFVO to establish, based on the newly added SAP instance, a network connection that is of the existing nested NS instance and that is in the composite NS instance. Correspondingly, the second NFVO receives the third request sent by the first NFVO. The second NFVO may establish, based on the newly added SAP instance and the information about the newly added SAP instance, the network connection that is of the existing nested NS instance and that is in the composite NS instance.

It may be understood that, in a scenario in which an NS instance is shared, SapInfo is carried in a notification (namely, the third request) of determining to use the NS instance, and the provider NFVO may be indicated to establish a network connection, in the composite NS instance managed by the consumer NFVO, of the nested NS instance based on the SapInfo from the perspective of the nested NS instance. This can meet a requirement for establishing, from the perspective of an existing nested NS, a network connection associated with the nested NS instance.

According to a third aspect, this application provides an apparatus. The apparatus may implement a function of a consumer NFVO, that is, the foregoing first NFVO. The apparatus may include a processing unit and a communications unit.

The communications unit may be configured to receive a request that is used to create a composite NS instance and that is sent by a sender (for example, an OSS/BSS).

The communications unit may be configured to send a first request to a provider NFVO (the foregoing second NFVO), where the first request is used to request the provider NFVO to create a nested NS instance in the composite NS instance.

The processing unit may be configured to: create a member instance (that is, another member instance) other than the nested NS instance in the composite NS instance; and establish a network connection between member instances.

For example, the first request carries information about a SAP instance associated with the nested NS instance. The information about the SAP instance may be used by the provider NFVO to establish, based on the SAP instance, a connection between the nested NS instance and the composite NS instance and a connection between the nested NS instance and the member instance in the composite NS instance, and is further used by the provider NFVO to establish, based on the SAP instance, a connection relationship to a member instance in the nested NS instance.

In some embodiments, the communications unit may be further configured to receive a request that is used to update the composite NS instance and that is sent by the sender (for example, the OSS/BSS). The communications unit may be further configured to send a second request to the second NFVO, where the second request may be used to request to update the nested NS instance in the composite NS instance. For example, the second request carries the information about the SAP instance associated with the nested NS instance, and the information about the SAP instance may be used by the second NFVO to update, based on the SAP instance, a network connection that is associated with the nested NS instance and that is in the composite NS instance. Optionally, the processing unit may be further configured to: update the member instance (that is, the other member instance) other than the nested NS instance in the composite NS instance, and update the network connection between member instances.

In some embodiments, after receiving the request that is used to create the composite NS instance and that is sent by the sender, the communications unit may be further configured to send a third request to the second NFVO, where the third request may be used to request to use an existing nested NS instance managed by the second NFVO to constitute a composite NS instance. For example, the third request carries information about a SAP instance that is of the existing nested NS instance and that is newly added in the composite NS instance managed by the first NFVO. The information about the newly added SAP instance may be used by the second NFVO to establish, based on the newly added SAP instance, a network connection that is of the existing nested NS instance and that is in the composite NS instance.

It may be understood that the processing unit and the communications unit may be configured to correspondingly perform the method provided in the first aspect or any possible implementation of the first aspect. Details are not described herein again.

According to a fourth aspect, this application provides an apparatus. The apparatus may implement a provider NFVO, that is, the foregoing second NFVO. The apparatus may include a processing unit and a receiving unit.

The receiving unit may be configured to receive a first request sent by a first NFVO. The first request carries information about a SAP instance associated with a nested NS instance, and is used to request the second NFVO to establish a nested NS instance in a composite NS instance.

The processing unit may be configured to establish, based on the SAP instance and the information about the SAP instance, a connection between the nested NS instance and the composite NS instance and a connection between the nested NS instance and a member instance in the composite NS instance, and establish, based on the SAP instance and the information about the SAP instance, a connection relationship to a member instance in the nested NS instance.

In this application, the information about the SAP instance may include first information and second information. The first information may be used by the second apparatus to establish, based on the SAP instance, a connection relationship in which the nested NS instance is connected to the member instance in the composite NS instance through the SAP instance. The second information may be used by the second apparatus to establish, based on the SAP instance, a connection relationship in which the nested NS instance is connected to the member instance in the nested NS instance through the SAP instance. For implementation of the SapInfo, refer to related descriptions in the method embodiments. Details are not described herein again.

In some embodiments, the receiving unit may be further configured to receive a second request sent by the first NFVO, where the second request may be used to request to update the nested NS instance in the composite NS instance. For example, the second request carries information about a SAP instance associated with the nested NS instance, and the information about the SAP instance may be used by the second apparatus to update, based on the SAP instance, a network connection that is associated with the nested NS instance and that is in the composite NS instance. Correspondingly, the processing unit may be further configured to update, based on the SAP instance and the information about the SAP instance, the network connection that is associated with the nested NS instance and that is in the composite NS instance.

In some embodiments, the receiving unit may be further configured to receive a third request sent by the first NFVO, where the third request may be used to use an existing nested NS instance managed by the second apparatus. For example, the third request carries information about a SAP instance that is of the existing nested NS instance and that is newly added in the composite NS instance managed by the first NFVO. The information about the newly added SAP instance may be used by the second apparatus to establish, based on the newly added SAP instance, a network connection that is of the existing nested NS instance and that is in the composite NS instance. Correspondingly, the processing unit may be further configured to establish, based on the newly added SAP instance and the information about the newly added SAP instance, the network connection that is of the existing nested NS instance and that is in the composite NS instance.

According to a fifth aspect, this application provides an apparatus configured to perform the network service management method in the first aspect. The apparatus implements the consumer NFVO in the method described in the first aspect, and may include a memory, a processor coupled to the memory, and a transceiver, where the transceiver is configured to communicate with another apparatus (for example, an apparatus for implementing a provider NFVO). The memory is configured to store code for implementing the network service management method described in the first aspect. The processor is configured to execute program code stored in the memory, that is, perform the method provided in the first aspect or any possible implementation of the first aspect.

According to a sixth aspect, this application provides an apparatus configured to perform the network service management method in the second aspect. The apparatus implements the provider NFVO in the method described in the first aspect, and may include a memory, a processor coupled to the memory, and a transceiver, where the transceiver is configured to communicate with another apparatus (for example, an apparatus for implementing a consumer NFVO). The memory is configured to store code for implementing the network service management method described in the second aspect. The processor is configured to execute program code stored in the memory, that is, perform the method provided in the second aspect or any possible implementation of the second aspect.

According to a seventh aspect, this application provides an NFV MANO system, including a first apparatus (implementing a consumer NFVO) and a second apparatus (implementing a provider NFVO), where the first apparatus may be the apparatus provided in the third aspect or the fifth aspect, and the second apparatus may be the apparatus provided in the fourth aspect or the sixth aspect.

According to an eighth aspect, a computer-readable storage medium is provided. The readable storage medium stores program code for implementing the network service management method provided in the first aspect or any possible implementation of the first aspect. The program code includes an execution instruction for running the network service management method provided in the first aspect or any possible implementation of the first aspect.

According to a ninth aspect, a computer-readable storage medium is provided. The readable storage medium stores program code for implementing the network service management method provided in the second aspect or any possible implementation of the second aspect. The program code includes an execution instruction for running the network service management method provided in the second aspect or any possible implementation of the second aspect.

According to a tenth aspect, a computer program product including an instruction is provided. When the instruction is run on a computer, the computer is enabled to perform the network service management method described in the first aspect.

According to an eleventh aspect, a computer program product including an instruction is provided. When the instruction is run on a computer, the computer is enabled to perform the network service management method described in the second aspect.

BRIEF DESCRIPTION OF DRAWINGS

To describe the technical solutions in the embodiments of this application or in the background more clearly, the following briefly describes the accompanying drawings required for describing the embodiments of this application or the background.

DESCRIPTION OF EMBODIMENTS

Terms used in an implementation part of this application are merely used to explain example embodiments of this application, but are not intended to limit this application.

Figure 1:
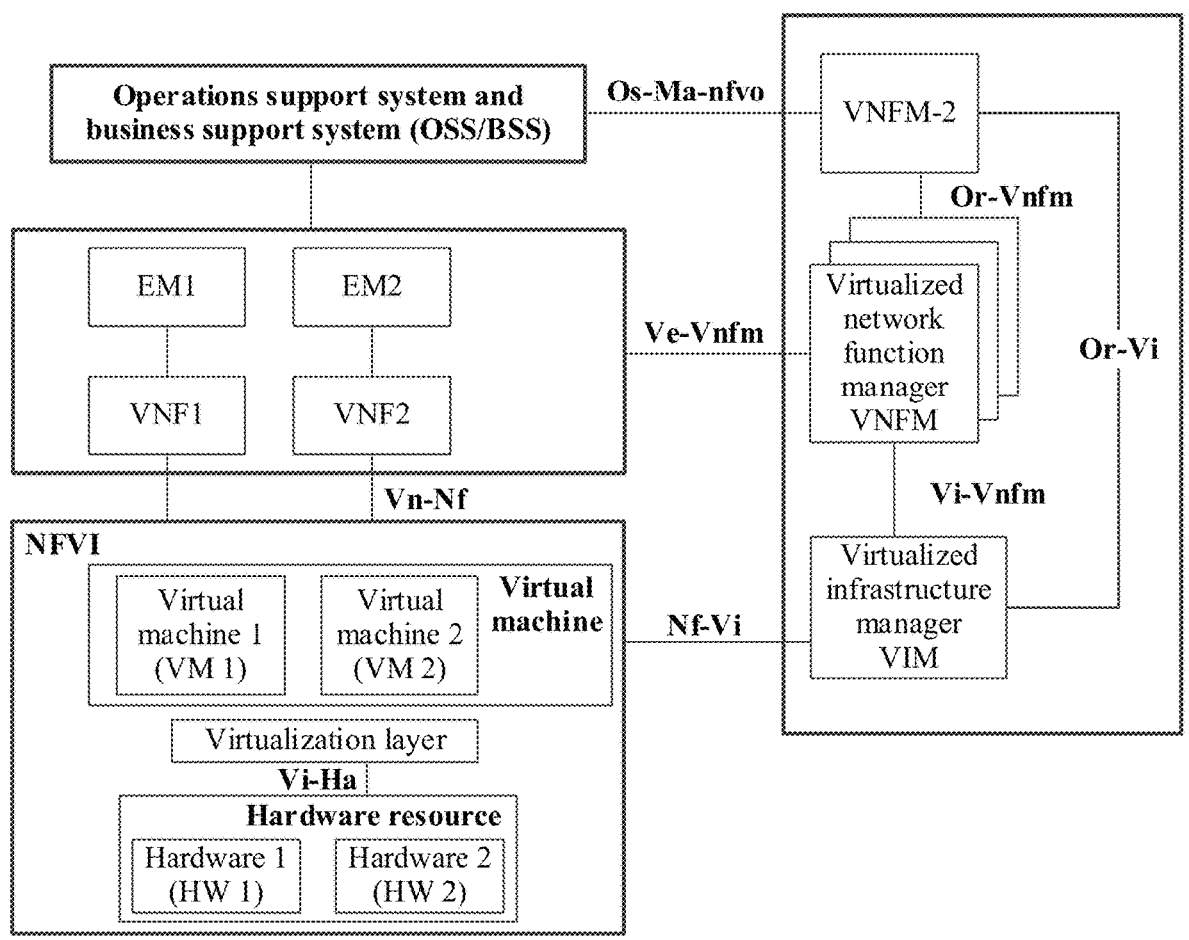
FIG. 1 is a schematic diagram of an existing NFV MANO architecture.
Figure 2:
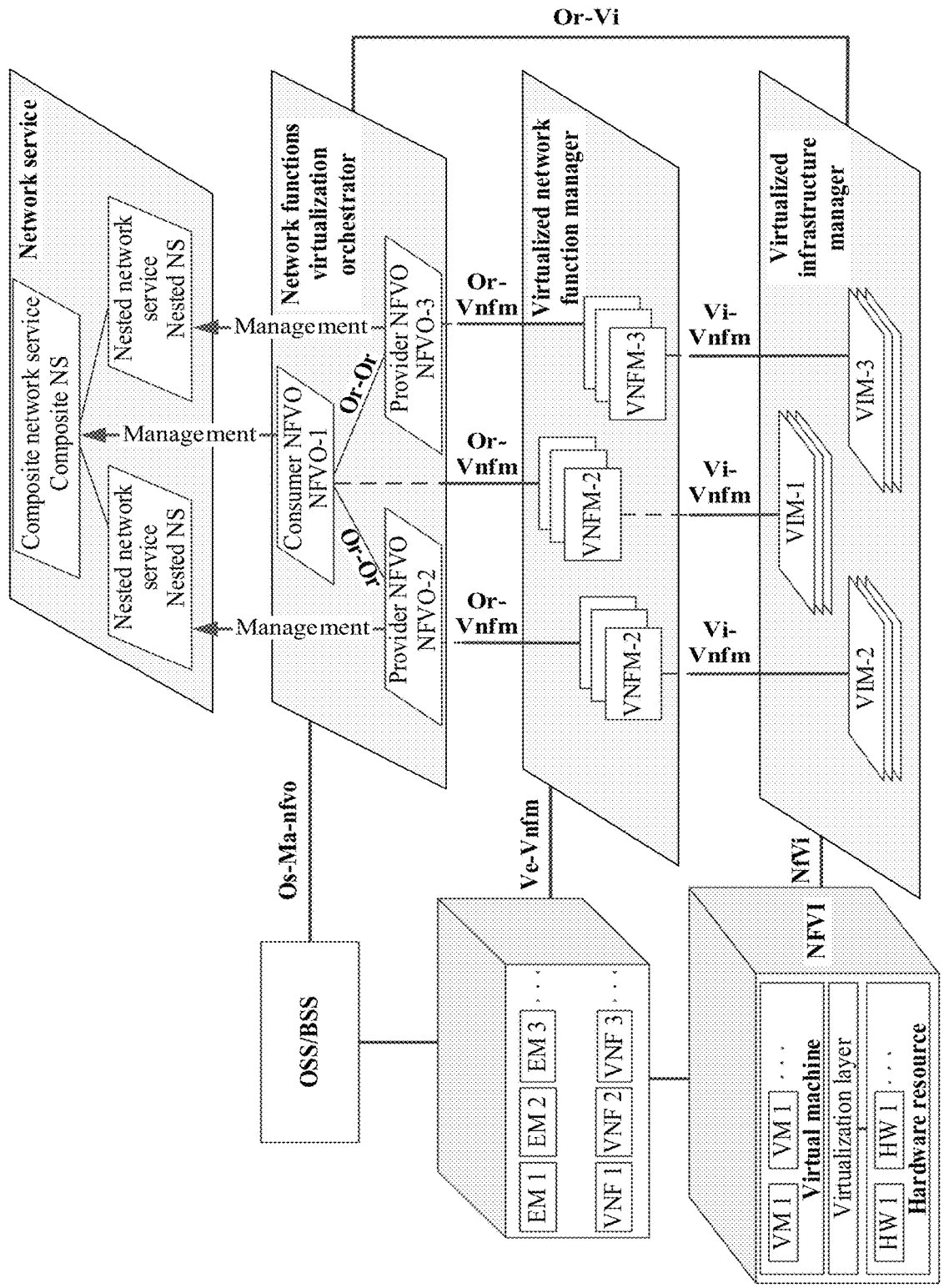
FIG. 2 is a schematic diagram of an NFV MANO architecture in a scenario in which a network service is provided across a plurality of administrative domains.

FIG. 2 shows an example of an NFV MANO architecture in a scenario in which a network service is provided across a plurality of administrative domains. The scenario in which a network service is provided across a plurality of administrative domains may exist when a large service provider provides a global network service (NS) through collaboration of branches, or when different service providers provide a lease service of a network service (NS) using a network sharing protocol. The global NSis also referred to as a composite network service (Composite NS). Compared with the NFV MANO architecture shown in FIG. 1, the NFV MANO architecture (which is applied to the scenario in which a network service is provided across a plurality of administrative domains) shown in FIG. 2 have some changes. In FIG. 2, a consumer NFVO manages the composite NS, and a provider NFVO manages a nested NS included in the composite NS. For functions and definitions of components (such as an NFVO, a VNFM, a VIM, an OSS/BSS, an EM, a VNF, and an NFVI) of the NFV MANO architecture shown in FIG. 2, refer to related descriptions in the background. Details are not described herein again.

It should be noted that the NFV MANO architecture shown in FIG. 2 is merely used to describe the technical solutions in this application more clearly, but does not constitute a limitation on this application. A person of ordinary skill in the art may learn that the NFV MANO architecture applicable to the scenario in which a network service is provided across a plurality of administrative domains may further evolve.

(1) Providing a Network Service Across a Plurality of Administrative Domains

One composite network service may include one or more nested network services, and each nested network service may be provided by an administrative domain different from an administrative domain that provides the composite network service. Description is provided below in detail with reference to FIG. 3 and FIG. 4.

Figure 3:
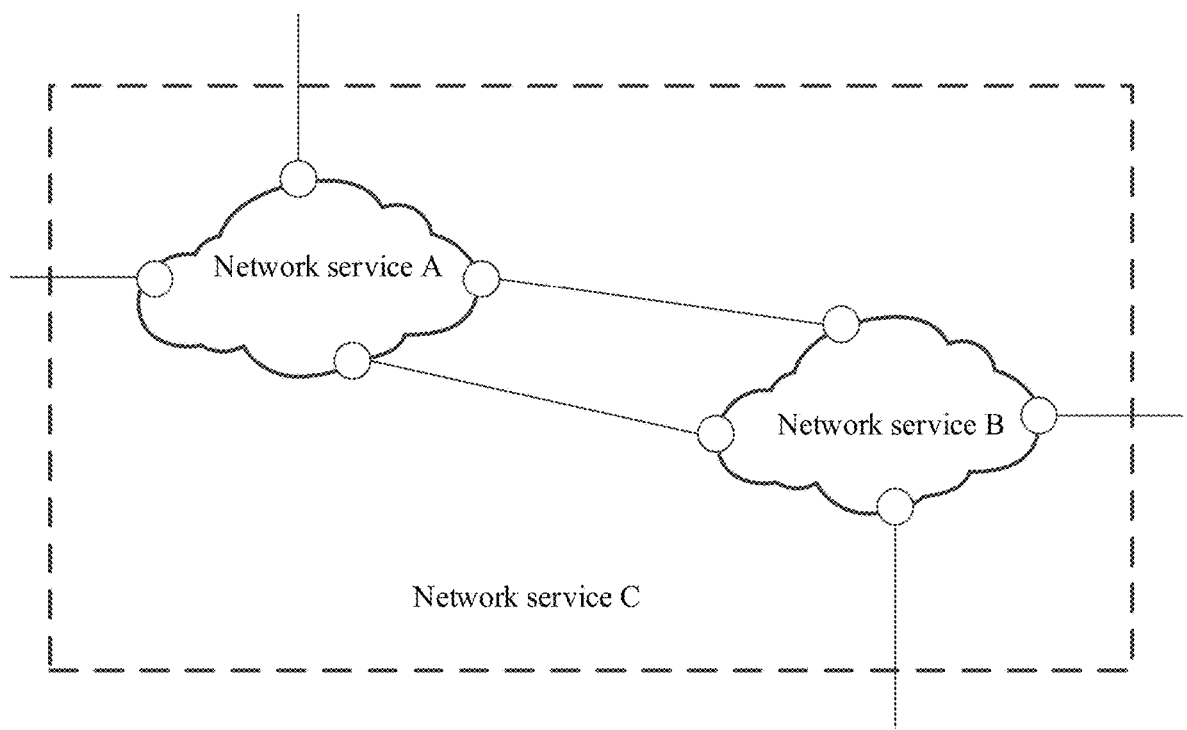
FIG. 3 is a schematic diagram of a composite network service and a nested network service.

FIG. 3 shows an example of a composite network service and a nested network service. As shown in FIG. 3, a composite network service C provided by an administrative domain C includes nested network services A and B, and the nested network services A and B are provided by administrative domains A and B respectively. The nested network service A or B may also be shared by another composite network service (which is not the composite network service C) in the administrative domain C or an administrative domain different from the administrative domain C. The administrative domain refers to a set of MANO management functional entities that include one or more data centers (DCs), one or more VIMs that manage the data centers, and one or more VNFMs (including all VNFs managed by the VNFMs). Each administrative domain includes one NFVO configured to provide a specific group of network services in the administrative domain.

Figure 4:
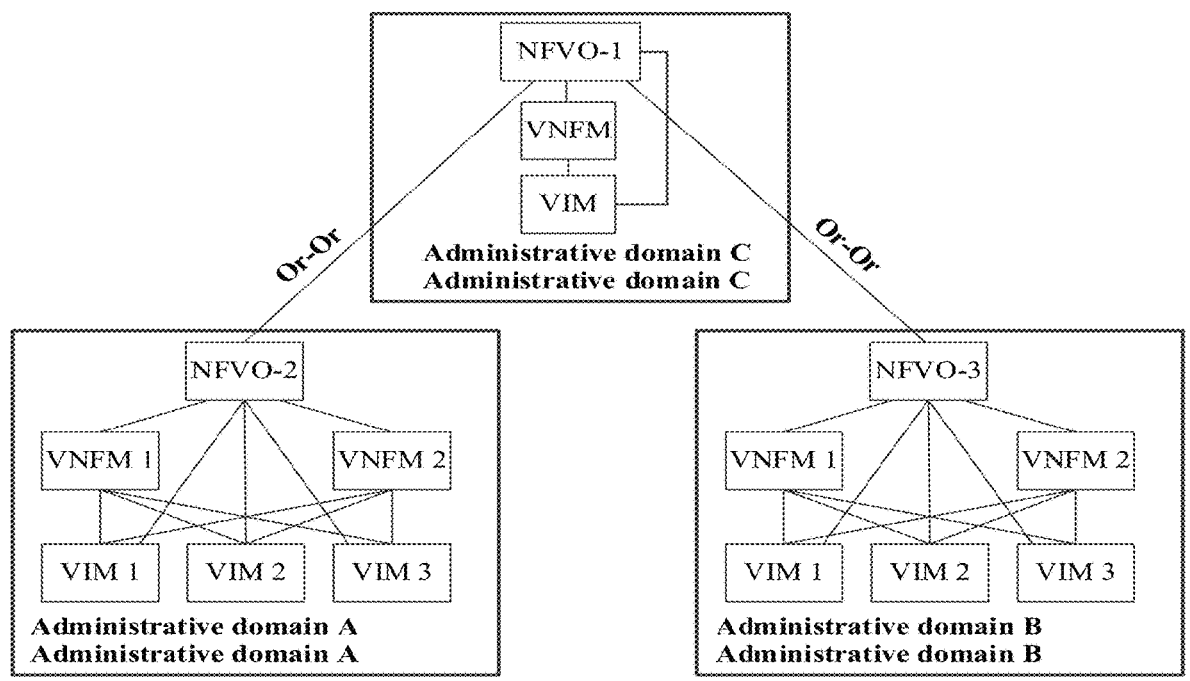
FIG. 4 is a schematic diagram of a plurality of administrative domains and NFVOs corresponding to the plurality of administrative domains.

FIG. 4 shows an example of a plurality of administrative domains. Each administrative domain provides one group of network services. An NFVO-1 in the administrative domain C is at a top layer, which means that the NFVO-1 manages the composite network service C. An NFVO-2 in the administrative domain A and an NFVO-3 in the administrative domain B manage the nested network services A and B respectively, and expose the nested network services to the NFVO-1 in the administrative domain C. Herein, different NFVOs may interact with each other through a reference point Or-Or.

Figure 5:
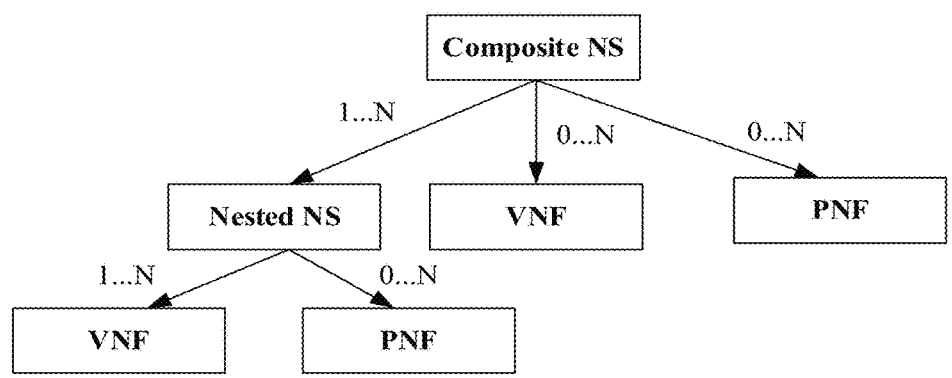
FIG. 5 is a schematic diagram of a hierarchical structure of a composite NS.

For example, concepts of a composite NS and a nested NS are proposed for a hierarchical structure of an NS instance. As shown in FIG. 5, a composite NS instance may be usually represented as a tree-like hierarchical structure, and an NS instance located at the top of the hierarchical structure (a root node of the tree-like structure) is referred to as a composite NS instance. Member instances in one composite NS instance may include one or more nested NS instances, and may further include one or more VNF instances or PNF instances. In the composite NS instance, the nested NS instance, the VNF instance, and the PNF instance are at a same hierarchical level. Member instances in one nested NS instance may include one or more VNF instances or PNF instances. Optionally, a member instance in one nested NS instance may include a sub-nested NS instance.

An example is used for describing the concepts of the composite NS and the nested NS. To implement a virtualized evolved packet core (vEPC) network service, member VNF instances may be used to constitute several nested NS instances. For example, a virtualized MME (vMME) function, a control plane function of a virtualized SGW (vSGW), and a control plane function of a virtualized PGW (vPGW) are used to constitute a vEPC control plane network service. A user plane function of the vSGW and a user plane function the vPGW are used to constitute a vEPC user plane (or forwarding plane) network service. Policy control-related functions, such as a virtualized policy and charging rules function (vPCRF), virtual traffic detection function (vTDF), and virtual service capability exposure function (vSCEF), are used to constitute a vEPC policy control network service. In the application, the vEPC is a composite NS, and the vEPC control plane network service, the vEPC user plane (or forwarding plane) network service, and the vEPC policy control network service are nested NSs.

Further, how to provide a vEPC network service by a telecom operator having an ultra-large quantity of users is considered. Assuming that a network of the telecom operator has a two-level structure: a group company network and a plurality of provincial subsidiary networks, each level of the network has an administrative domain for the level of the network, and is configured with one NFVO. In this scenario, an NFVO in the group company network may be considered as a consumer NFVO (an NFVO-1), and an NFVO in each of the provincial subsidiary networks may be considered as a provider NFVO (an NFVO-2). When the telecom operator determines to provide the vEPC network service at a level of the group company network, the telecom operator may specify that a vEPC control plane network service is provided by a Guangdong provincial subsidiary network, a vEPC user plane network service is provided by a Jiangsu provincial subsidiary network, and a vEPC policy control network service is provided by a Zhejiang provincial subsidiary network.

In a scenario in which a network service is provided across a plurality of administrative domains, the composite NS and the nested NS are located in different administrative domains, and life cycle management for the composite NS and the nested NS is performed by NFVOs (including the consumer NFVO and one or more provider NFVOs) in different administrative domains.

(2) Virtual Link Information Model of a Network Service

The following separately describes, from the perspective of a design time and a runtime, a virtual link information model defined in an existing ETSI NFV standard.

Figure 6A:
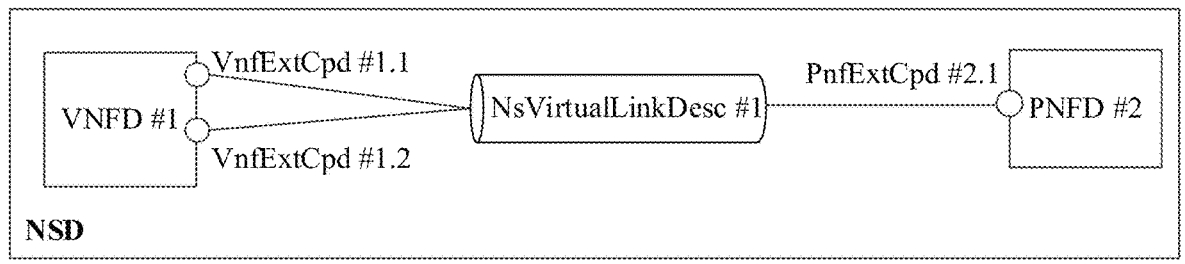
FIG. 6A to FIG. 6C are schematic diagrams of existing virtual link information models in a design time.
Figure 6B:
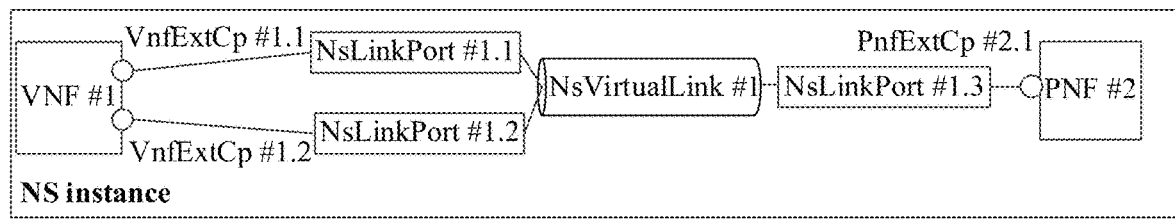
Figure 6C:
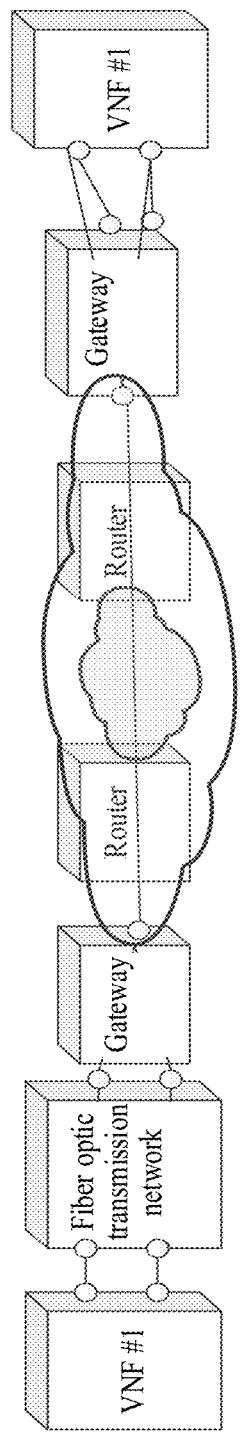

FIG. 6A to FIG. 6C shows virtual link information models used to connect member instances in a network service.

As shown in FIG. 6A, the virtual link (VL) information model is defined starting from an association relationship between descriptors in the design time. A virtual link descriptor is an information model template to which a reference needs to be made when a virtual link is instantiated, and includes a static attribute of a virtual link instance before the virtual link instance is created. In the design time, a network service descriptor (NSD) needs to indicate: a VNF descriptor (VNFD) and/or a PNF descriptor (PNFD) that are/is associated with the virtual link descriptor, a specific VNF external connection point descriptor (VnfExtCpd) used to associate the virtual link descriptor with a corresponding VNFD, and/or a specific PNF external connection point descriptor (PnfExtCpd) used to associate the virtual link descriptor with a corresponding PNFD.

As shown in FIG. 6B, after entering the runtime, the virtual link instance is created with reference to the virtual link descriptor. For example, with reference to the virtual link descriptor, the virtual link instance is associated with a specific VNF instance (which indicates that the virtual link instance is connected to the VNF instance), and/or the virtual link instance is associated with a specific PNF instance (which indicates that the virtual link instance is connected to the PNF instance). An association relationship between the virtual link instance and the VNF instance (or the PNF instance) is established by configuring an association between an external connection point VnfExtCp instance (or a PnfExtCp instance) of the VNF instance (or the PNF instance) and a port NsLinkPort of the virtual link instance. The virtual link instance in the runtime is finally mapped to a corresponding virtual network resource at an NFVI layer, and is connected, through a network link at a layer 2 (L2) or layer 3 (L3), to a configured virtual port of a VNF instance of a virtualized computing and storage resource or a configured virtual port of a PNF instance. Reference may be made to FIG. 6C.

Figure 7A:
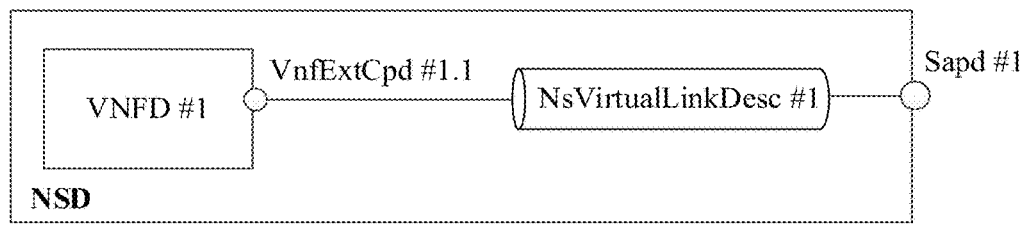
FIG. 7A to FIG. 7C are schematic diagrams, corresponding to FIG. 6A to FIG. 6C, of existing virtual link information models in a runtime.
Figure 7B:
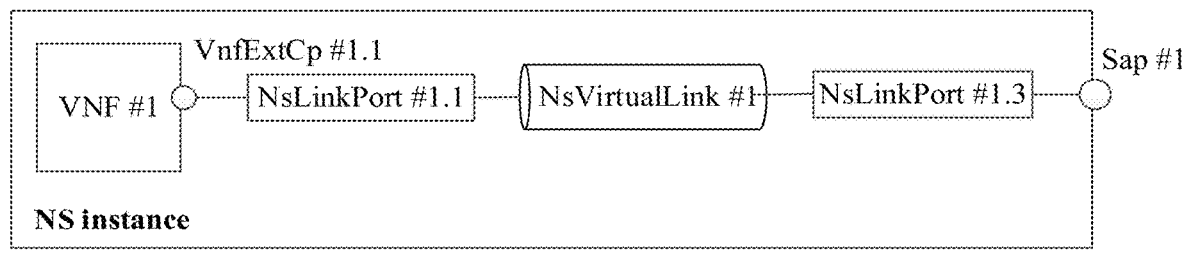
Figure 7C:
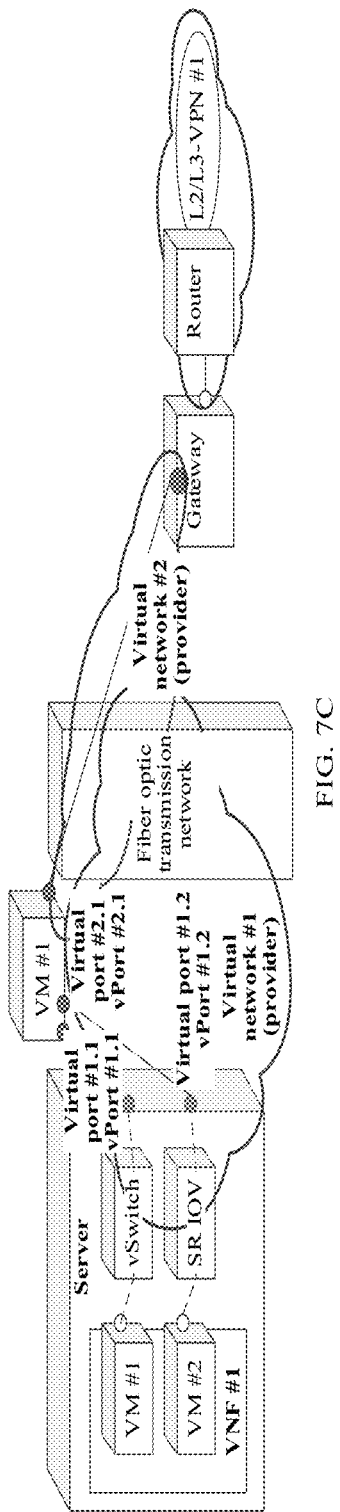

FIG. 7A to FIG. 7C shows how a virtual link is used to connect a member instance of a network service to a service access point (SAP) of the network service.

Similarly, as shown in FIG. 7A, in the design time, the following needs to be indicated: a VNFD (or a PNFD) and a service access point descriptor (SAPD) that are associated with a virtual link descriptor, and a specific VNF external connection point descriptor (VnfExtCpd) or PNF external connection point descriptor (PnfExtCpd) that is used to associate the virtual link descriptor with a corresponding SAPD.

As shown in FIG. 7B, after entering the runtime, a virtual link instance is associated with a specific VNF instance (or a specific PNF instance) and a specific SAP instance with reference to the virtual link descriptor. It indicates that the virtual link instance is connected to the VNF instance (or the PNF instance) and the SAP instance. The virtual link instance in the runtime is finally mapped to a corresponding virtual network resource at an NFVI layer, and is connected, through a network link at a layer 2 (L2) or layer 3 (L3), to a configured virtual port of a VNF instance of a virtualized computing and storage resource or a configured virtual port of a PNF instance, and a configured virtual port of a SAP instance. Reference may be made to FIG. 7C.

The design time mentioned in this application refers to a phase in which an association relationship between various descriptors (such as a network service descriptor, a VNF descriptor, a PNF descriptor, a virtual link descriptor, and an external connection point descriptor) is defined before instantiation of a network service or establishment of a network connection. The runtime mentioned in this application refers to a phase, during or after the instantiation of the network service or the establishment of the network connection, in which an association relationship between instances (such as a network service instance, a VNF instance, a PNF instance, a virtual link instance, and an external connection point instance) is set based on the association relationship between various descriptors defined in the design time. It should be understood that each instance is created or updated with reference to a descriptor file corresponding to the instance.

It can be learned from the foregoing that the virtual link information model defined in the existing ETSI NFV standard mainly describes a connection to the VNF instances and/or the PNF instance in an NS instance and a connection between a SAP of the NS instance and the VNF instance and/or the PNF instance from the perspective that a consumer NFVO performs network connection. However, there is no virtual link information model defined from the perspective of a nested NS instance.

In addition, in a scenario in which an NS is provided across a plurality of administrative domains, there may be a requirement of information isolation between different administrative domains. For example, a VNF external connection point descriptor (VnfExtCpd) in an administrative domain corresponding to a consumer NFVO is invisible to a provider NFVO. Similarly, a VNF external connection point descriptor (VnfExtCpd) in an administrative domain corresponding to the provider NFVO is invisible to the consumer NFVO. However, a topology structure described in the virtual link information model defined in the existing ETSI NFV standard is visible to the outside. Therefore, the virtual link information model defined in the existing ETSI NFV standard cannot meet the requirement of information isolation between different administrative domains.

This application provides a network service management method in which a virtual link information model is defined from the perspective of a nested NS instance. In this way, the nested NS instance can be externally connected to a composite NS instance and each member instance in the composite NS instance through a virtual link, and can be internally connected to each member instance in the nested NS instance through a virtual link.

In this application, the virtual link information model defined from the perspective of the nested NS instance may include two parts: an external virtual link information model and an internal virtual link information model.

(1) External virtual link information model: The nested NS instance may be connected, based on a SAP instance of the nested NS instance, to an external link point of another member instance in the composite NS instance through an external virtual link. For example, the external link point of the other member instance is an external connection point VnfExtCp of a VNF instance, an external connection point PnfExtCp of a PNF instance, or a SAP of another nested NS instance. The nested NS instance may be further connected, based on the SAP instance of the nested NS instance, to a SAP instance of the composite NS instance through an external virtual link. In other words, an external virtual link instance may be used to externally connect the nested NS instance to a member instance in the composite NS instance based on the SAP instance of the nested NS instance.

(2) Internal virtual link information model: The nested NS instance is connected, based on a SAP instance of the nested NS instance, to an external link point of a member instance in the nested instance through an internal virtual link. For example, the external link point of the member instance is an external connection point VnfExtCp of a VNF instance, an external connection point PnfExtCp of a PNF instance, or a SAP of a sub-nested NS instance. In other words, an internal virtual link instance may be used to internally connect the nested NS instance to the member instance in the nested NS instance based on the SAP instance of the nested NS instance.

First, the external virtual link information model is described.

Figure 8A:
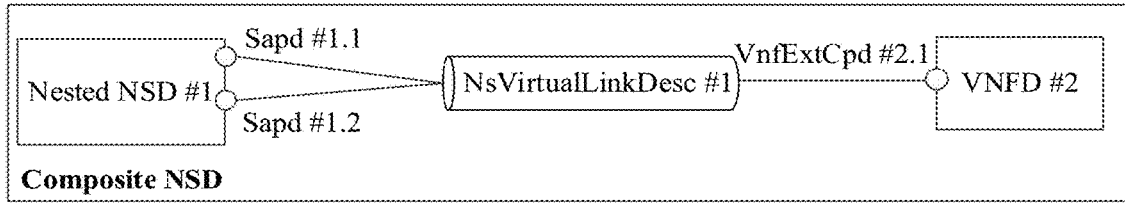
FIG. 8A to FIG. 8C are schematic diagrams of existing virtual link information models in a design time.
Figure 8B:
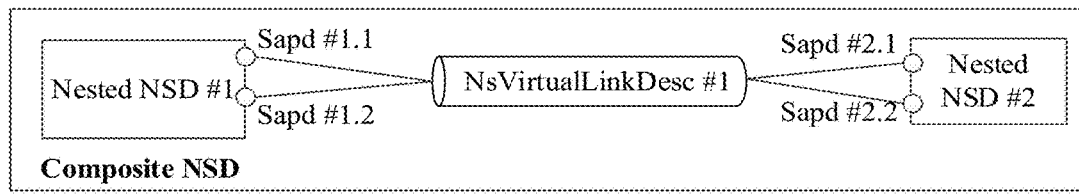
Figure 8C:
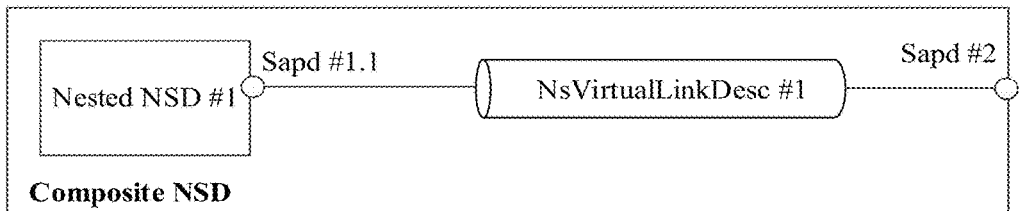

FIG. 8A to FIG. 8C show examples of external virtual link information models in a design time. The external virtual link information model in the design time is mainly used to indicate an association relationship between descriptors, to provide a reference for a connection relationship related to subsequent instantiation of an external virtual link.

As shown in FIG. 8A, a nested network service descriptor Nested NSD #1 is associated with an external virtual link descriptor NSVirtualLinkDesc #1 and a descriptor VNFD #2 of a VNF in a composite network service. For example, the NSVirtualLinkDesc #1 is associated with the Nested NSD #1 using SAP descriptors Sapd #1.1 and Sapd #1.2, and is associated with the VNFD #2 using an external connection point descriptor PnfExtCp #2.1.

As shown in FIG. 8B, a nested network service descriptor Nested NSD #1 is associated with an external virtual link descriptor NSVirtualLinkDesc #1 and a descriptor Nested NSD #2 of another nested network service in a composite network service. For example, the NSVirtualLinkDesc #1 is associated with the Nested NSD #1 using SAP descriptors Sapd #1.1 and Sapd #1.2, and is associated with the Nested NSD #2 using service access point descriptors Sapd #2.1 and Sapd #2.2.

As shown in FIG. 8C, a nested network service descriptor Nested NSD #1 is associated with an external virtual link descriptor NSVirtualLinkDesc #1 and a descriptor Sapd #2 of a service access point of a composite network service.

Figure 9A:
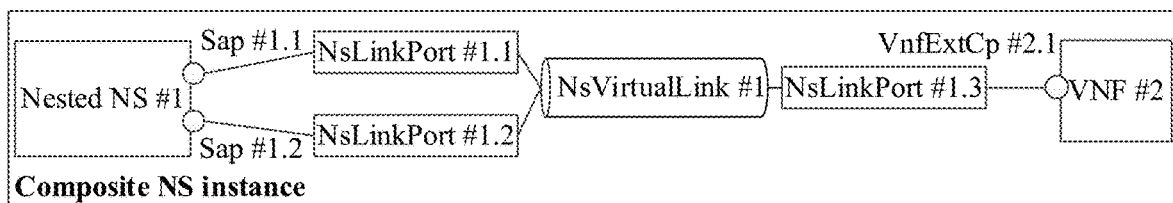
FIG. 9A to FIG. 9C are schematic diagrams, corresponding to FIG. 8A to FIG. 8C, of existing virtual link information models in a runtime.
Figure 9B:
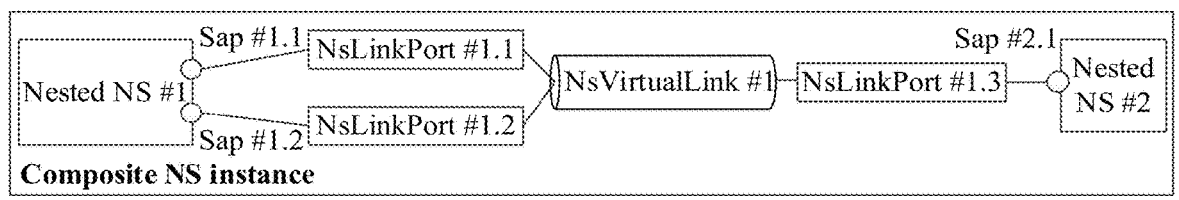
Figure 9C:
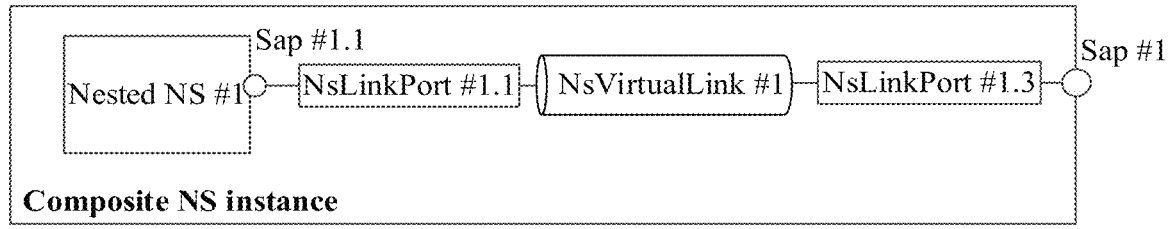

FIG. 9A to FIG. 9C show examples of external virtual link information models that are in a runtime and based on a SAP of a nested NS. The external virtual link information model in the runtime is mainly used to indicate an association relationship between instances, and is used to establish a connection between the instances. After the instances enter the runtime, the external virtual link information models in the runtime shown in FIG. 9A to FIG. 9C are respectively created with reference to the external virtual link information models in the design time shown in FIG. 8A to FIG. 8C.

As shown in FIG. 9A, a nested NS instance Nested NS #1 is connected, based on service access points Sap #1.1 and Sap #1.2 of the nested NS instance Nested NS #1, to an external link point VnfExtCp #2.1 of a VNF instance VNF #2 in a composite NS instance through an external virtual link instance NSVirtualLink #1. For example, the NSVirtualLink #1 is connected to the Sap #1.1 through a port instance NsLinkPort #1.1, is connected to the Sap #1.2 through a port instance NsLinkPort #1.2, and is connected to the VnfExtCp #2.1 through a port instance NsLinkPort #1.3. It can be learned that connections indicated by the external virtual link information model in FIG. 9A are established with reference to the external virtual link information model in the design time in FIG. 8A.

As shown in FIG. 9B, a nested NS instance Nested NS #1 is connected, based on service access points Sap #1.1 and Sap #1.2 of the nested NS instance Nested NS #1, to a SAP #2.1 of another nested NS instance Nested NS #2 in a composite NS instance through an external virtual link instance NSVirtualLink #1. For example, the NSVirtualLink #1 is connected to the Sap #1.1 through a port instance NsLinkPort #1.1, is connected to the Sap #1.2 through a port instance NsLinkPort #1.2, and is connected to the Sap #2.1 through a port instance NsLinkPort #1.3. It can be learned that connections indicated by the external virtual link information model in FIG. 9B are established with reference to the virtual link information model in the design time in FIG. 8B.

As shown in FIG. 9C, a nested NS instance Nested NS #1 is connected, based on a SAP #1.1 of the nested NS instance Nested NS #1, to a SAP #1 of a composite NS instance through an external virtual link instance NSVirtualLink #1. For example, the NSVirtualLink #1 is connected to the Sap #1.1 through a port instance NsLinkPort #1.1. It can be learned that a connection indicated by the external virtual link information model in FIG. 9C is established with reference to the virtual link information model in the design time in FIG. 8C.

The examples shown in FIG. 8A to FIG. 8C and FIG. 9A to FIG. 9C are merely used to explain this application, but shall not constitute a limitation.

Then, the internal virtual link information model is described.

Figure 10A:
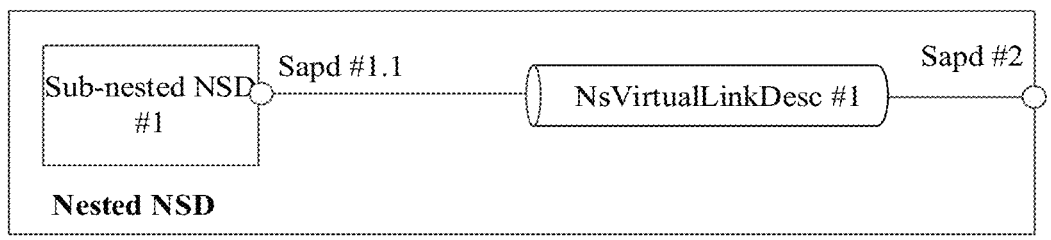
FIG. 10A to FIG. 10C are schematic diagrams of virtual link information models that are in a design time and that are defined from the perspective of a nested NS according to this application.
Figure 10B:
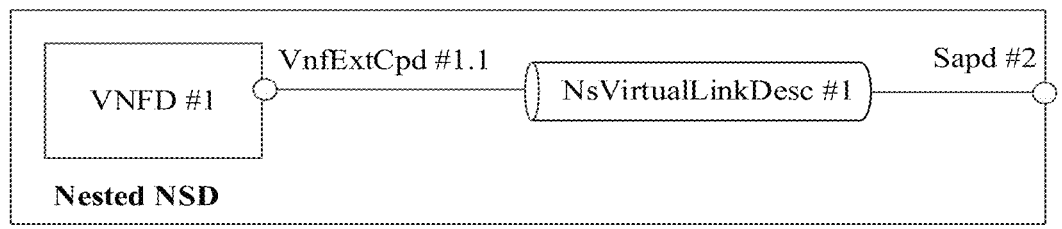
Figure 10C:
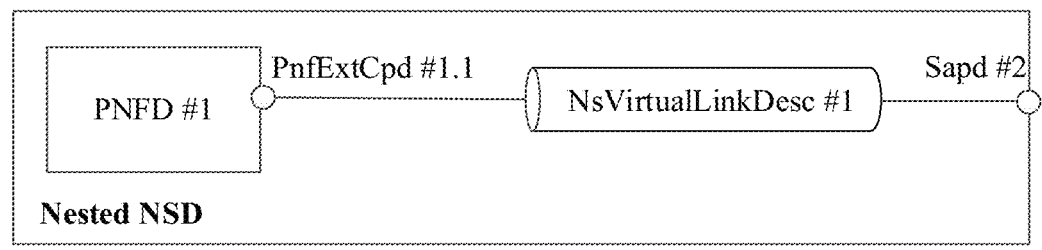

FIG. 10A to FIG. 10C show examples of internal virtual link information models in a design time. The internal virtual link information model in the design time is mainly used to indicate an association relationship between descriptors, to provide a reference for a connection relationship related to subsequent instantiation of an internal virtual link.

As shown in FIG. 10A, a descriptor Sub-Nested NSD #1 of a sub-nested NS in a nested NS is associated with an internal virtual link descriptor NSVirtualLinkDesc #1 and a descriptor Sapd #2 of a SAP of the nested NS. For example, the NSVirtualLinkDesc #1 is associated with the Sub-Nested NSD #1 using a SAP descriptor Sapd #1.1.

As shown in FIG. 10B, a descriptor VNFD #1 of a VNF in a nested NS is associated with an internal virtual link descriptor NSVirtualLinkDesc #1 and a descriptor Sapd #2 of a SAP of the nested NS. For example, the NSVirtualLinkDesc #1 is associated with the VNFD #1 using an external connection point descriptor VnfExtCpd #1.1.

As shown in FIG. 10C, a descriptor PNFD #1 of a PNF in a nested NS is associated with an internal virtual link descriptor NSVirtualLinkDesc #1 and a descriptor Sapd #2 of a SAP of the nested NS. For example, the NSVirtualLinkDesc #1 is associated with the PNFD #1 using an external connection point descriptor VnfExtCpd #1.1.

Figure 11A:
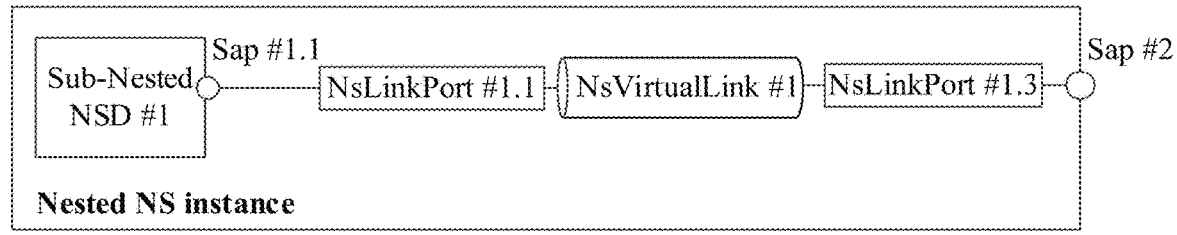
FIG. 11A to FIG. 11C are schematic diagrams, corresponding to FIG. 10A to FIG. 10 C, of virtual link information models that are in a runtime and that are defined from the perspective of a nested NS.
Figure 11B:
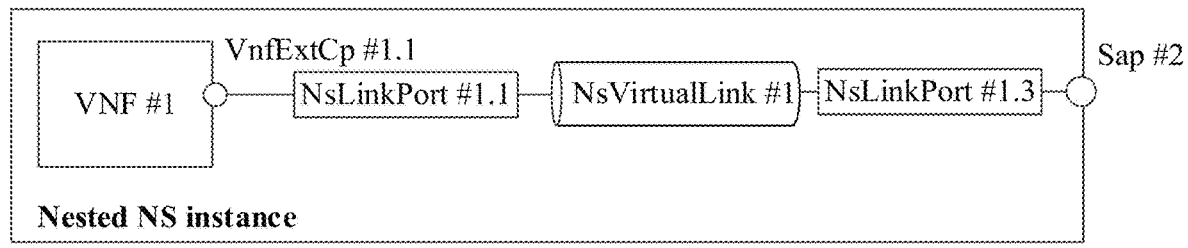
Figure 11C:
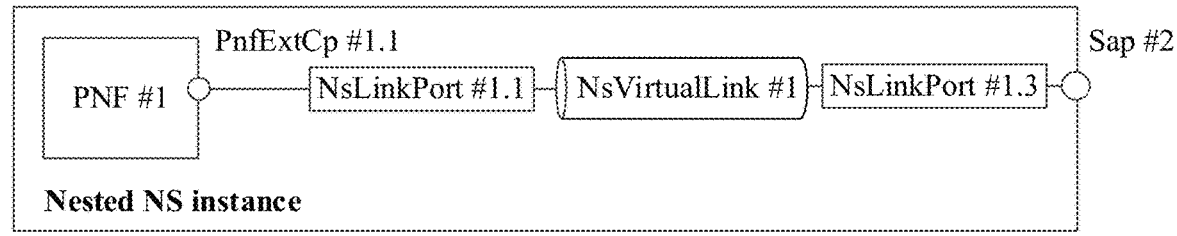

FIG. 11A to FIG. 11C show examples of internal virtual link information models that are in a runtime and based on a SAP of a nested NS. The internal virtual link information model in the runtime is mainly used to indicate an association relationship between instances, and is used to establish a connection between the instances. After the instances enter the runtime, the internal virtual link information models in the runtime shown in FIG. 11A to FIG. 11C are respectively created with reference to the internal virtual link information models in the design time shown in FIG. 10A to FIG. 10C.

As shown in FIG. 11A, a sub-nested NS instance Sub-Nested NS #1 is connected, based on a SAP #1.1 of the sub-nested NS instance Sub-Nested NS #1, to a service access point instance Sap #1 of a nested NS instance through an internal virtual link instance NSVirtualLink #1. For example, the NSVirtualLink #1 is connected to the Sap #1.1 through a port instance NsLinkPort #1.1, and is connected to the Sap #1 through a port instance NsLinkPort #1.3. It can be learned that a connection indicated by the internal virtual link information model in FIG. 11A is established with reference to the virtual link information model in the design time in FIG. 10A.

As shown in FIG. 11B, a VNF instance VNF #1 is connected, based on an external connection point VnfExtCp #1.1 of the VNF instance VNF #1, to a service access point instance Sap #1 of a nested NS instance through an internal virtual link instance NSVirtualLink #1. For example, the NSVirtualLink #1 is connected to the VnfExtCp #1.1 through a port instance NsLinkPort #1.1, and is connected to the Sap #1 through a port instance NsLinkPort #1.3. It can be learned that a connection indicated by the internal virtual link information model in FIG. 11B is established with reference to the virtual link information model in the design time in FIG. 10B.

As shown in FIG. 11C, a PNF instance PNF #1 is connected, based on an external connection point PnfExtCp #1.1 of the PNF instance PNF #1, to a service access point instance Sap #1 of a nested NS instance through an internal virtual link instance NSVirtualLink #1. For example, the NSVirtualLink #1 is connected to the PnfExtCp #1.1 through a port instance NsLinkPort #1.1, and is connected to the Sap #1 through a port instance NsLinkPort #1.3. It can be learned that a connection indicated by the internal virtual link information model in FIG. 11C is established with reference to the virtual link information model in the design time in FIG. 10C.

The examples shown in FIG. 10A to FIG. 10C and FIG. 11A to FIG. 11C are merely used to explain this application, but shall not constitute a limitation.

It may be understood that virtual link information models defined in this application are designed from the perspective of the nested NS instance, and can better meet a requirement for describing a network connection from the perspective of a nested NS. For example, for a consumer NFVO (NFVO-1) and a provider NFVO (NFVO-2), a virtual link needs to be used to establish a connection between a nested NS instance managed by the NFVO-2 and the composite NS instance managed by the NFVO-1.

In some optional embodiments, a peer connection point, such as a SAP of a sub-nested NS, an external connection point VnfExtCp of a VNF, or an external connection point PnfExtCp of a PNF, that is connected to the nested NS through an internal virtual link may be invisible to the consumer NFVO. In other words, information about the peer connection point may not be reflected in the virtual link information model. This further meets a requirement of information isolation between different administrative domains.

Figure 12:
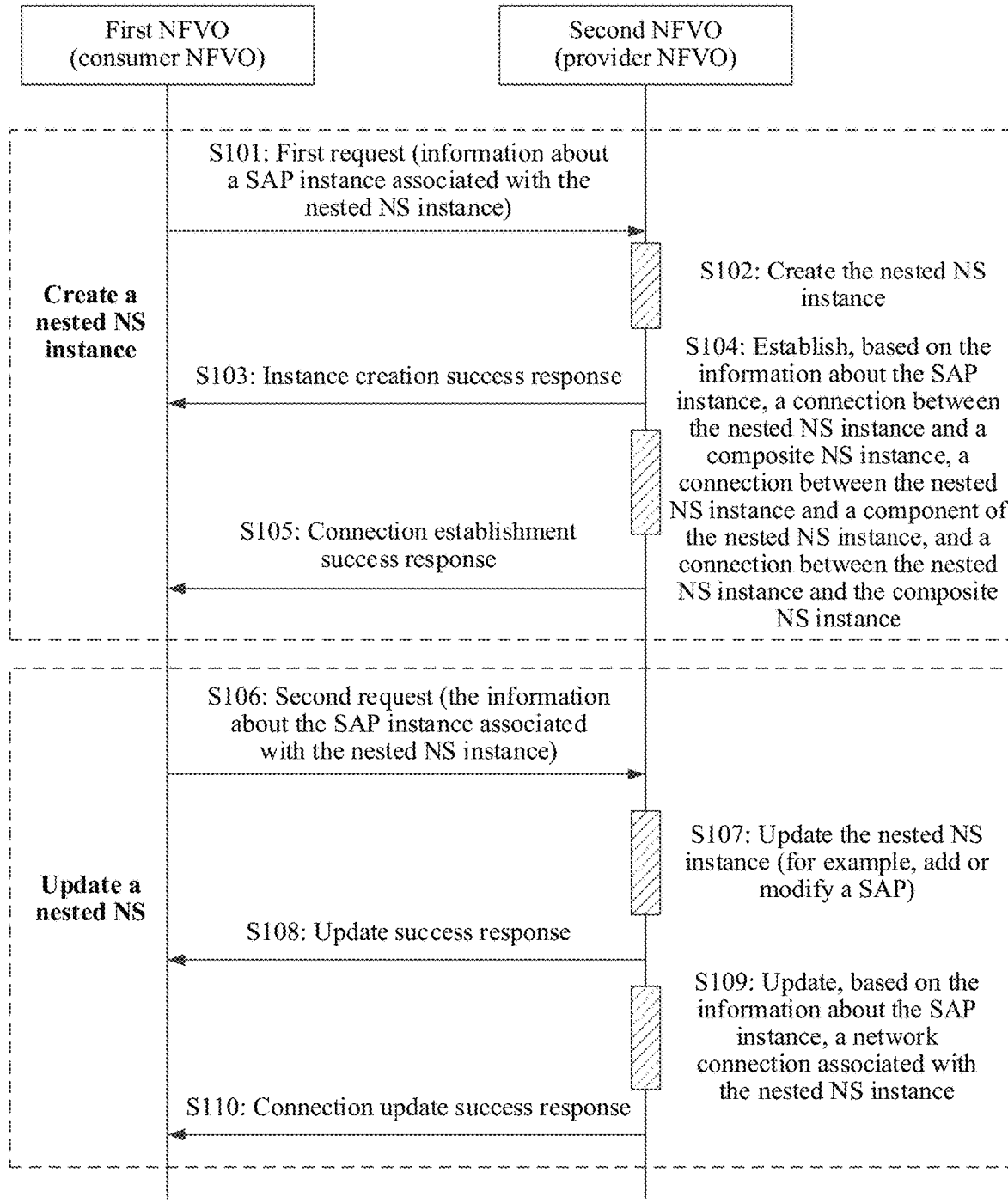
FIG. 12 is a schematic flowchart of a network service management method according to this application.

Based on the virtual link information model defined in this application, the provider NFVO that manages the nested NS may establish a connection indicated by the virtual link information model. With reference to FIG. 12, the following describes an overall procedure of a network service management method provided in this application. Details are as follows.

S101: A first NFVO sends a first request to a second NFVO. Herein, the first NFVO may be a consumer NFVO that manages a composite NS instance, and the second NFVO may be a provider NFVO that manages a nested NS instance. For example, the first request may be used to request to create the nested NS instance in the composite NS instance and carries information about a SAP instance associated with the nested NS instance.

Herein, the information about the SAP instance is used to describe a virtual link information model associated with the SAP instance, and may be used by the second NFVO to establish connections indicated by the virtual link information model, to be more specific, establish a connection between the nested NS instance and the composite NS instance that is externally connected to the nested NS instance based on the SAP instance and a connection between the nested NS instance and a member instance that is in the composite NS instance and that is externally connected to the nested NS instance based on the SAP instance, and establish a connection between the nested NS instance and a member instance that is in the nested NS instance and that is internally connected to the nested NS instance based on the SAP instance.

S102 and S103: Correspondingly, the second NFVO receives the first request sent by the first NFVO, and in response to the first request, the second NFVO may perform a procedure of creating the nested NS instance and then return an instance creation success response to the first NFVO. The response may carry an identifier of the created nested NS instance.

S104 and S105: The second NFVO may establish, based on the information (which is briefly referred to as SapInfo below) that is about the SAP instance associated with the nested NS instance and that is carried in the first request, the connection between the nested NS instance and the composite NS instance that is externally connected to the nested NS instance through the SAP instance and the connection between the nested NS instance and the member instance that is in the composite NS instance and that is externally connected to the nested NS instance through the SAP instance. Additionally, the second NFVO may establish the connection between the nested NS instance and the member instance that is in the nested NS instance and that is internally connected to the nested NS instance through the SAP instance; and then the second NFVO may return a connection establishment complete response to the first NFVO. Optionally, the connection establishment complete response may alternatively be combined into the foregoing instance creation success response. In other words, the second NFVO may return the connection establishment complete response to the first NFVO implicitly, that is, use the instance creation success response to indicate that connection establishment is completed.

It may be understood that, the SapInfo is carried in a request (namely, the first request) used to create the nested NS instance, to indicate the provider NFVO to establish external and internal network connections of the nested NS instance based on the SapInfo from the perspective of the nested NS instance. This can meet a requirement for establishing a network connection from the perspective of a nested NS.

The following describes implementation of the SapInfo in detail.

In this application, the SapInfo may include two parts: first information and second information. The first information is used to describe an external virtual link information model, and may be used by the second NFVO to establish a connection between the nested NS instance and a member instance that is in the composite NS instance and that is (externally) connected to the nested NS instance through the SAP instance. The second information is used to describe an internal virtual link information model, and may be used by the second NFVO to establish a connection between the nested NS instance and a member instance that is in the nested NS instance and that is (internally) connected to the nested NS instance through the SAP instance.

In this application, the first information may include an identifier of an external virtual link instance, an identifier of a port through which the SAP instance is connected to the external virtual link instance, and an identifier of a peer connection point connected to the SAP instance through the external virtual link instance. The peer connection point connected to the SAP instance through the external virtual link instance may be an external connection point that is of the member instance in the composite network service instance and that is connected to the SAP instance through the external virtual link instance. For example, the external connection point is an external connection point VnfExtCp of a VNF instance, an external connection point PnfExtCp of a PNF instance, or a SAP of another nested NS instance. The peer connection point connected to the SAP instance through the external virtual link instance may alternatively be a SAP of the composite NS instance.

In this application, the second information may include an identifier of an internal virtual link instance, a port through which the SAP instance is connected to the internal virtual link instance, and an identifier of a peer connection point connected to the SAP instance through the internal virtual link instance. The peer connection point connected to the SAP instance through the internal virtual link instance may be an external connection point that is of the member instance in the nested network service instance and that is connected to the SAP instance through the internal virtual link instance. For example, the external connection point is an external connection point VnfExtCp of a VNF instance, an external connection point PnfExtCp of a PNF instance, or a SAP of a sub-nested NS instance.

Information about the peer connection point may not be reflected in the internal virtual link information model, to ensure information isolation between different administrative domains. To be more specific, the second information may optionally include an identifier of a second virtual link instance and a port through which the SAP instance is connected to the internal virtual link instance, but does not include an identifier of a peer connection point connected to the SAP instance through the internal virtual link instance. In other words, an internal peer connection point that is internally connected to the nested NS instance through the SAP instance is invisible to the outside (that is, the composite NS instance and another member instance in the composite NS instance).

For example, Table 1 to Table 3 show an example of an implementation of the SapInfo.

TABLE 1

| Attribute | Qualifier | Cardinality | Content | Description |
|---|---|---|---|---|
| SAP instance identifier | Mandatory | 1 | Identifier | Identifier of the SAP instance, which can be used to identify the SapInfo |
| SAPD identifier | Mandatory | 1 | Identifier | SAPD identifier used for SAP instantiation |
| SAP name | Mandatory | 1 | String | Human-readable SAP name |
| Description | Mandatory | 1 | String | Human-readable SAP description |
| Address | Mandatory | 1 | Not assigned | SAP address, which can be provided by an NFVO |
| Internal association | Mandatory | 1 | Internal association | Topology link internally associated with a SAP through a virtual link |
| External association | Mandatory | 1 | External association | Topology link externally associated with a SAP through a virtual link |

Table 2 shows an example of the internal association in Table 1 (which meets the requirement of information isolation between different administrative domains). Details are as follows.

TABLE 2

| Attribute attribute | Qualifier qualifier | Cardinality cardinality | Content content | Description description |
|---|---|---|---|---|
| Internal virtual link instance identifier | Mandatory | 1 | Identifier ID | Identifier of an internal virtual link |
| Internal link port | Mandatory | 1 | Identifier ID | Port through which a SAP is connected to the internal virtual link |

Table 3 shows an example of the external association in Table 1. Details are as follows.

TABLE 3

| Attribute attribute | Qualifier qualifier | Cardinality cardinality | Content content | Description description |
|---|---|---|---|---|
| External virtual link instance identifier | Mandatory | 1 | Identifier ID | Identifier of an external virtual link |
| External link port | Mandatory | 1 | Identifier ID | Port through which a SAP is connected to the external virtual link |
| Peer connection point | Mandatory | 1 | Identifier ID | Peer connection point connected to the SAP through the external virtual link |

With reference to Table 1 to Table 3, Table 1 shows content included in the SapInfo, where the internal association is the second information, and the external association is the first information. Table 2 shows content included in the internal association, and the information about the peer connection point is not reflected herein, that is, the internal peer connection point is invisible to the outside. Table 3 shows content included in the external association. The peer connection point may be the external connection point VnfExtCp of the VNF instance in the composite NS instance, the external connection point PnfExtCp of the PNF instance, or the SAP of the other nested NS instance. The peer connection point may alternatively be the SAP of the composite NS instance.

If all member instances in the composite NS instance are available, the second NFVO that manages the nested NS may establish, based on the virtual link information model, connections indicated by the virtual link information model. Herein, all the member instances in the composite NS instance may include all nested NS instances, all VNF instances, and all PNF instances in the composite NS instance.

1. In this application, the second NFVO may establish, based on the SAP instance of the nested NS instance, connections indicated by the external virtual link information model in at least one of the following manners.

Manner 1: The second NFVO establishes, based on the first information in the SapInfo, a connection between the SAP instance and a SAP instance that is of the composite NS instance and that is externally connected to the SAP instance through the external virtual link instance.

Manner 2: The second NFVO establishes, based on the first information in the SapInfo, a connection between the SAP instance and a SAP instance that is of a nested NS instance in the composite NS instance and that is externally connected to the SAP instance through the external virtual link instance.

Manner 3: The second NFVO establishes, based on the first information in the SapInfo, a connection between the SAP instance and the external connection point that is of the VNF instance in the composite NS instance and that is externally connected to the SAP instance through the external virtual link instance.

Manner 4: The second NFVO establishes, based on the first information in the SapInfo, a connection between the SAP instance and the external connection point that is of the PNF instance in the composite NS instance and that is externally connected to the SAP instance through the external virtual link instance.

2. In this application, the second NFVO may establish, based on the SAP instance of the nested NS instance, connections indicated by the internal virtual link information model in at least one of the following manners.

Manner 1: The second NFVO establishes, based on the second information in the SapInfo, a connection between the SAP instance and a SAP instance that is of a sub-nested NS instance in the nested NS instance and that is internally connected to the SAP instance through the internal virtual link instance.

Manner 2: The second NFVO establishes, based on the second information in the SapInfo, a connection between the SAP instance and the external connection point that is of the VNF instance in the nested NS instance and that is internally connected to the SAP instance through the internal virtual link instance.

Manner 3: The second NFVO establishes, based on the second information in the SapInfo, a connection between the SAP instance and the external connection point that is of the PNF instance in the nested NS instance and that is internally connected to the SAP instance through the internal virtual link instance.

Figure 13:
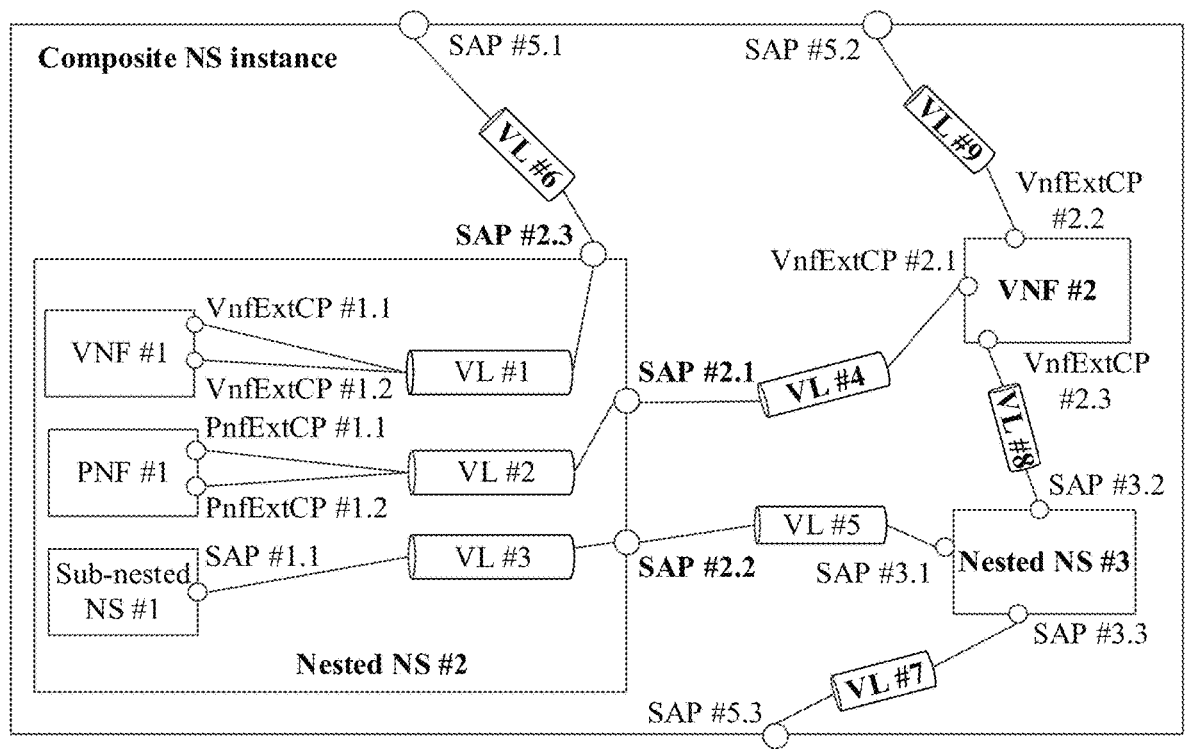
FIG. 13 is an example of a schematic diagram of a network connection established in a composite NS from the perspective of a nested NS.

With reference to FIG. 13, the following describes in detail the SapInfo and how the second NFVO establishes, based on the SapInfo, connections indicated by the virtual link information model described by the SapInfo. It is assumed that the first NFVO manages a composite NS instance in FIG. 13, and the second NFVO manages a nested NS #2 in FIG. 13. In addition, the first request carries information (that is, SapInfo) about a SAP instance associated with the nested NS #2.

I. SapInfo Associated with the Nested NS #2

As shown in FIG. 13, the SapInfo associated with the nested NS #2 includes information about a SAP #2.1, information about a SAP #2.2, and information about a SAP #2.3.

(1) The information about the SAP #2.1 is used to describe a virtual link information model associated with the SAP #2.1, to be more specific, an internal virtual link (VL #2) information model and an external virtual link (VL #4) information model. The SAP #2.1 is externally connected to a VNF #2 through the external virtual link (VL #4), and is internally connected to a PNF #1 through the internal virtual link (VL #2).

For example, the information about the SAP #2.1 may include first information and second information. The first information may include an identifier of the VL #4, an identifier of a port (not shown in the figure) through which the SAP #2.1 is externally connected to an external peer connection point through the VL #4, and an identifier of the external peer connection point (to be more specific, an external connection point VnfExtCP #2.1 of the VNF #2) connected to the SAP #2.1 through the VL #4. The second information may include an identifier of the VL #2 and identifiers of ports (not shown in the figure) through which the SAP #2.1 is internally connected to internal peer connection points through the VL #2. Optionally, identifiers of the internal peer connection points, to be more specific, identifiers of external link points PnfExtCP #1.1 and PnfExtCP #1.2 of the PNF #1, may be included in the second information, or may not be included in the second information. When there is a requirement of information isolation between different administrative domains, the identifiers of the internal peer connection points are not included in the second information.

(2) The information about the SAP #2.2 is used to describe a virtual link information model associated with the SAP #2.2, to be more specific, an internal virtual link (VL #3) information model and an external virtual link (VL #5) information model. The SAP #2.2 is externally connected to a nested NS #3 through the external virtual link (VL #5), and is internally connected to a sub-nested NS #1 through the internal virtual link (VL #3).

For example, the information about the SAP #2.2 may include first information and second information. The first information may include an identifier of the VL #5, an identifier of a port (not shown in the figure) through which the SAP #2.2 is externally connected to an external peer connection point through the VL #5, and an identifier of the external peer connection point (to be more specific, a SAP #3.1 of the nested NS #3) connected to the SAP #2.2 through the VL #5. The second information may include an identifier of the VL #3 and an identifier of a port (not shown in the figure) through which the SAP #2.2 is internally connected to an internal peer connection point through the VL #3. Optionally, an identifier of the internal peer connection point, to be more specific, an identifier of a SAP #1.1 of the sub-nested NS #1, may be included in the second information, or may not be included in the second information. When there is a requirement of information isolation between different administrative domains, the identifier of the internal peer connection point is not included in the second information.

(3) The information about the SAP #2.3 is used to describe a virtual link information model associated with the SAP #2.3, to be more specific, an internal virtual link (VL #1) information model and an external virtual link (VL #6) information model. The SAP #2.3 is externally connected to the composite NS instance through the external virtual link (VL #6), and is internally connected to a VNF #1 through the internal virtual link (VL #1).

For example, the information about the SAP #2.3 may include first information and second information. The first information may include an identifier of the VL #6, an identifier of a port (not shown in the figure) through which the SAP #2.3 is externally connected to an external peer connection point through the VL #6, and an identifier of the external peer connection point (to be more specific, a SAP #5.1 of the composite NS instance) connected to the SAP #2.3 through the VL #6. The second information may include an identifier of the VL #1 and identifiers of ports (not shown in the figure) through which the SAP #2.3 is internally connected to internal peer connection points through the VL #1. Optionally, identifiers of the internal peer connection points, to be more specific, identifiers of external connection points VnfExtCP #1.1 and VnfExtCP #1.2 of the VNF #1, may be included in the second information, or may not be included in the second information. When there is a requirement of information isolation between different administrative domains, the identifiers of the internal peer connection points are not included in the second information.

II. The second NFVO establishes, based on the SapInfo, the connections indicated by the virtual link information model described by the SapInfo.

(1) For example, a manner in which the second NFVO establishes connections based on the information about the SAP #2.1 may include the following steps.

1. The second NFVO may establish, based on the first information in the information about the SAP #2.1, a connection between the SAP #2.1 and the external connection point VnfExtCP #2.1 that is of the VNF #2 in the composite NS instance and that is externally connected to the SAP #2.1 through the VL #4.

2. The second NFVO may establish, based on the second information in the information about the SAP #2.1, connections between the SAP #2.1 and the external connection points PnfExtCP #1.1 and PnfExtCP #1.2 that are of the PNF #1 in the nested NS #2 and that are internally connected to the SAP #2.1 through the VL #2. Optionally, when the second information does not include the identifiers of the PnfExtCP #1.1 and the PnfExtCP #1.2, the second NFVO may independently determine, according to a preset policy, internal peer connection points that are to be internally connected to the SAP #2.1 through the VL #2. For example, the second NFVO may select, based on a service type, internal peer connection points that are to be internally connected to the VL #2. Service types associated with the selected internal peer connection points are responsible are the same as a service type associated with the VnfExtCP #2.1 that is connected to the SAP #2.1 through the VL #4. The example is merely used to explain this application, and shall not constitute a limitation.

(2) An example of a manner in which the second NFVO may establish connections based on the information about the SAP #2.2 may include the following steps.

1. The second NFVO may establish, based on the first information in the information about the SAP #2.2, a connection between the SAP #2.2 and the SAP #3.1 that is of the nested NS #3 in the composite NS instance and that is externally connected to the SAP #2.2 through the VL #5.

2. The second NFVO may establish, based on the second information in the information about the SAP #2.2, a connection between the SAP #2.2 and the SAP #1.1 that is of the sub-nested NS #1 in the nested NS #2 and that is internally connected to the SAP #2.2 through the VL #3. Optionally, when the second information does not include the identifier of the SAP #1.1, the second NFVO may independently determine, according to a preset policy, an internal peer connection point that is to be internally connected to the SAP #2.2 through the VL #3. For example, the second NFVO may select, based on a service type, an internal peer connection point that is to be internally connected to the VL #3. A service type associated with the selected internal peer connection point is the same as a service type associated with the SAP #3.1 that is connected to the SAP #2.2 through the VL #5. The example is merely used to explain this application, and shall not constitute a limitation.

(3) An example of a manner in which the second NFVO may establish connections based on the information about the SAP #2.3 may include the following steps.

1. The second NFVO may establish, based on the first information in the information about the SAP #2.3, a connection between the SAP #2.3 and the SAP #5.1 that is of the composite NS instance and that is externally connected to the SAP #2.3 through the VL #6.

2. The second NFVO may establish, based on the second information in the information about the SAP #2.3, connections between the SAP #2.3 and the external connection points VnfExtCP #1.1 and VnfExtCP #1.2 that are of the VNF #1 in the nested NS #2 and that are internally connected to the SAP #2.3 through the VL #1. Optionally, when the second information does not include the identifiers of the VnfExtCP #1.1 and the VnfExtCP #1.2, the second NFVO may independently determine, according to a preset policy, internal peer connection points that are internally connected to the SAP #2.3 through the VL #1. For example, the second NFVO may select, based on a service type, internal peer connection points that are internally connected to the VL #3. Service types associated with the selected internal peer connection points are the same as a service type associated with the SAP #5.1. The example is merely used to explain this application, and shall not constitute a limitation.

Similarly, for the second NFVO that manages the nested NS #3 in the examples in FIG. 13, SapInfo associated with the nested NS #3 includes information about the SAP #3.1, information about a SAP #3.2, and information about a SAP #3.3. The second NFVO that manages the nested NS #3 may establish, based on the SapInfo associated with the nested NS #3, connections indicated by a virtual link information model described by the SapInfo. For details, refer to the examples in FIG. 13, and details are not described herein again.

In this application, an external virtual link may be referred to as a first virtual link, and an internal virtual link may be referred to as a second virtual link.

Further, as shown in FIG. 12, the first NFVO may initiate, to the second NFVO, a process of updating the nested NS instance, for example, adding a service access point or modifying a service access point, to indicate the second NFVO to update a network connection associated with the nested NS instance. Details are as follows.

S106. The first NFVO sends a second request to the second NFVO. For example, the second request may be used to request to update the nested NS instance in the composite NS instance. Optionally, the second request may further include an NS update type, for example, adding a service access point or modifying a service access point. For example, the second request may carry the SapInfo associated with the nested NS instance.

Herein, the SapInfo is used to describe a virtual link information model associated with the SAP instance, and may be used by the second NFVO to update network connections associated with the nested NS instance, to be more specific, update the connection between the nested NS instance and the composite NS instance that is externally connected to the nested NS instance based on the SAP instance and the connection between the nested NS instance and the member instance that is in the composite NS instance and that is externally connected to the nested NS instance based on the SAP instance. Alternatively, the SapInfo may be used to update the connection between the nested NS instance and the member instance that is in the nested NS instance and that is internally connected to the nested NS instance based on the SAP instance. For implementation of the SapInfo, refer to related descriptions in S101 to S105. Details are not described herein again.

S107 and S108: Correspondingly, the second NFVO receives the second request sent by the first NFVO, and in response to the second request, the second NFVO may perform a procedure of updating the nested NS instance and then return an instance update success response to the first NFVO.

S109 and S110: The second NFVO may update, based on the SapInfo that is associated with the nested NS instance and that is carried in the second request, the connection between the nested NS instance and the composite NS instance that is externally connected to the nested NS instance based on the SAP instance and the connection between the nested NS instance and the member instance that is in the composite NS instance and that is externally connected to the nested NS instance based on the SAP instance. Alternatively, the second NFVO may update the connection between the nested NS instance and the member instance that is in the nested NS instance and that is internally connected to the nested NS instance based on the SAP instance. Then, the second NFVO may return a connection update success response to the first NFVO.

For example, updating of the network connections associated with the nested NS instance may include at least one of the following: establishing a new network connection associated with the nested NS instance, modifying an existing network connection associated with the nested NS instance, or removing an existing network connection associated with the nested NS instance.

For example, in the examples in FIG. 13, for the second NFVO that manages the nested NS #2, it is assumed that the NS update type included in the second request is adding a SAP instance, and SapInfo included in the second request is information about a "SAP #2.4" (not shown). In this case, the second NFVO may establish, based on the information about the SAP #2.4, external connection and internal connections that are of the nested NS #2 and that are based on the SAP #2.4, in other words, establish new network connections associated with the nested NS instance.

For another example, in the examples in FIG. 13, for the second NFVO that manages the nested NS #2, it is assumed that the NS update type included in the second request is modifying a SAP instance, and SapInfo included in the second request is updated information about the SAP #2.2, where the first information is updated and includes: an identifier of a VL #11, an identifier of a port through which the SAP #2.2 is externally connected to an external peer connection point through the VL #11, and an identifier of a peer connection point (to be more specific, a service access point ExtVnfCP #3.1 of a VNF #3 (not shown)) connected to the SAP #2.2 through the VL #11. In this case, the second NFVO may update, based on the updated information about the SAP #2.2, an external connection that is of the nested NS #2 and that is based on the SAP #2.2, in other words, update a network connection associated with the nested NS instance.

For still another example, in the examples in FIG. 13, for the second NFVO that manages the nested NS #2, it is assumed that the NS update type included in the second request is removing a SAP instance, and SapInfo included in the second request is information about a to-be-removed SAP #2.3. In this case, the second NFVO may remove an external connection that is of the nested NS #2 and that is based on the SAP #2.2, in other words, remove a network connection associated with the nested NS instance.

The foregoing examples are merely used to explain this application, and shall not constitute a limitation.

It may be understood that, the SapInfo is carried in a request (namely, the second request) used to update the nested NS instance, and the provider NFVO may be indicated to update external and internal network connections of the nested NS instance based on the SapInfo from the perspective of the nested NS instance. This can better meet a requirement for updating a network connection from the perspective of a nested NS.

In addition, a SAPD is extended in this application, to define a virtual link information model from the perspective of the nested NS. Content included in an extended SAPD may be shown in Table 4.

TABLE 4

| Attribute attribute | Qualifier qualifier | Cardinality cardinality | Content content | Description description |
|---|---|---|---|---|
| SAP address allocation | Mandatory | 1 | Boolean value | The SAP address allocation describes whether a management and orchestration function is responsible for the SAP address allocation. If the Boolean value is set to be true, the management and orchestration function allocates an address to a SAP instance that is created using the SAPD. |
| Virtual link descriptor ID | Mandatory | 0 . . . 1 | Identifier ID | Identifier of a descriptor of a virtual link connected to the SAP instance that is created using the SAPD |
| ID of an associated connection point descriptor | Mandatory | 0 . . . 1 | Identifier ID | Identifier of a descriptor of an external connection point of a VNF or PNF, and identifier of the SAPD |
| ID of an associated SAPD | Mandatory | 0 . . . 1 | Identifier ID | Identifier of a SAPD that is managed by a SAP instance connected to the SAP instance that is created using the SAPD |
| Inherited attribute | | | | All attributes inherited from a connection point |

In the extended SAPD shown in Table 4, such a newly added field, namely, the "ID of an associated SAPD" (associatedSapdID), defines an identifier of a SAPD associated with another SAP instance that is connected to the SAP instance created using the SAPD shown in Table 4 in a design time. In this way, the second NFVO may establish a corresponding connection between SAP instances based on an association relationship between SAPDs.

The following describes, using several embodiments, implementation of the network service management method provided in this application in different application scenarios. For ease of description, a first NFVO is briefly referred to as an NFVO-1, and a second NFVO is briefly referred to as an NFVO-2 in the following several embodiments.

Embodiment 1

Figure 14:
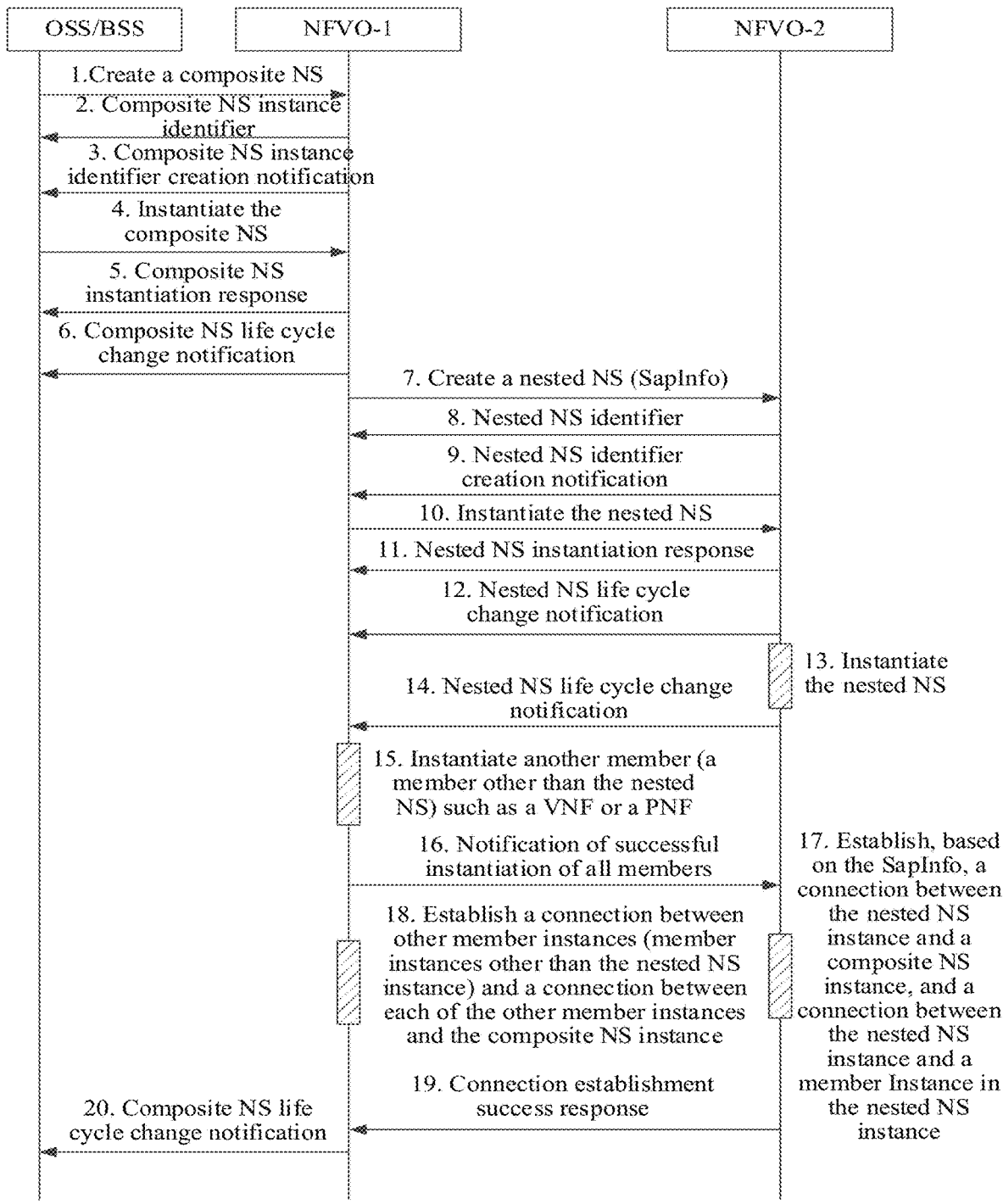
FIG. 14 is a schematic flowchart of implementing a network service management method in an application scenario according to this application.

FIG. 14 shows a process of instantiating a composite NS using a top-down method. The NFVO-1 initiates instantiation for each nested NS. This process mainly focuses on interaction performed through a reference point Or-Or.

Assumptions in the embodiment in FIG. 14 are as follows.
a. A mapping relationship <NSD, NFVO-2> is available for the NFVO-1.
b. There is no existing nested network service instance that can be directly used by a composite network service for instantiation. In other words, all nested NSs in the composite NS need to be created.
c. No nested NS instance is shared by another composite network service.

A process shown in FIG. 14 may be detailed as follows.

1. A sender (for example, an OSS/BSS) sends, to the NFVO-1, a request used to create a composite NS. For implementation of this step, refer to clause 7.3.2 in the ETSI Group Specification (GS) NFV Interfaces and Architecture 013 (NFV-IFA013) protocol. Details are not described herein again.

2. The NFVO-1 returns an ID of a composite NS instance to the sender. For implementation of this step, refer to clause 7.3.2 in the ETSI GS NFV-IFA013 protocol. Details are not described herein again.

3. The NFVO-1 sends a composite NS ID creation notification to the sender. For implementation of this step, refer to clause 8.3.2.9 in the ETSI GS NFV-IFA013 protocol. Details are not described herein again.

4. The sender sends a composite NS instantiation request to the NFVO-1, where the request carries a nested NS ID. For implementation of this step, refer to clause 7.3.3 in the ETSI GS NFV-IFA013 protocol. Details are not described herein again.

5. The NFVO-1 returns a composite NS instantiation response to the sender. For implementation of this step, refer to clause 7.3.3 in the ETSI GS NFV-IFA013 protocol. Details are not described herein again.

6. The NFVO-1 obtains a composite NSD used for instantiating the composite NS, and sends, to the sender, a composite NS life cycle change notification that indicates a "start of instantiation". For implementation of this step, refer to clause 8.3.2.2 in the ETSI GS NFV-IFA013 protocol. Details are not described herein again.

7. The NFVO-1 obtains, from the mapping relationship <NSD, NFVO-2>, an NFVO-2 corresponding to each nested NSD forming the composite NSD. For each member nested NS, the NFVO-1 sends a nested NS creation request (which is used to request to create a nested NS instance) to an NFVO-2 that manages the nested NS, where the request may carry SapInfo. The SapInfo may be used by the NFVO-2 to establish internal and external network connections that are based on a SAP instance of the nested NS instance. For implementation of the SapInfo, refer to related foregoing descriptions. Details are not described herein again.

8. The NFVO-2 returns an ID of the nested NS instance to the NFVO-1.

9. The NFVO-2 sends a nested NS instance ID creation notification to the NFVO-1.

10. The NFVO-1 sends a nested NS instantiation request to the NFVO-2, where the request carries the ID of the nested NS instance and is used to request to instantiate the nested NS.

11. The NFVO-2 returns a nested NS instantiation response to the NFVO-1.

12. The NFVO-2 sends, to the NFVO-1, a nested NS life cycle change notification that indicates a "start of instantiation".

13. The NFVO-2 performs a process of instantiating the nested NS.

14. As soon as the nest NS is successfully instantiated, the NFVO-2 sends, to the NFVO-1, a life cycle change notification that indicates a "result". For implementation of this step, refer to clause 8.3.2.2 in the ETSI GS NFV-IFA013 protocol. Details are not described herein again.

15. The NFVO-1 instantiates another member, such as a VNF or a PNF.

16. As soon as all members of the composite NS instance are successfully instantiated, the NFVO-1 sends a notification to the NFVO-2, to notify the NFVO-2 that all member instances are successfully instantiated.

17. The NFVO-2 establishes, based on the SapInfo carried in the request message, a connection between the nested NS instance and a member instance that is in the composite NS instance and that is (externally) connected to the nested instance through the SAP instance, and a connection between the nested NS instance and a member instance that is in the nested NS instance and that is (internally) connected to the nested NS instance through the SAP instance.

18. As soon as all members in the composite NS instance are successfully instantiated, the NFVO-1 establishes a connection between other member instances (member instances other than the nested NS instance) and a connection between each of the other member instances and the composite NS instance.

19. The NFVO-2 returns a connection establishment success response to the NFVO-1, to indicate that the internal and external network connections, formed through the SAP instance, of the nested NS instance are successfully established.

20. The NFVO-1 sends, to the sender, a composite NS life cycle change notification that indicates a "result". For implementation of this step, refer to clause 8.3.2.2 in the ETSI GS NFV-IFA013 protocol. Details are not described herein again.

In this embodiment, the nested NS creation request in step 7 carries the SapInfo, and is equivalent to the first request mentioned in the method procedure in FIG. 12. The SapInfo may be used by the NFVO-2 to establish the internal and external network connections that are based on the SAP instance of the nested NS instance. Optionally, the SapInfo may alternatively be carried in the nested NS instantiation request in step 10. In this case, the nested NS instantiation request may be equivalent to the first request mentioned in the method procedure in FIG. 12.

In this embodiment, for step 17 for an implementation of establishing, by the second NFVO based on the SapInfo, connections indicated by a virtual link information model described by the SapInfo, refer to related content in the overall method procedure described in FIG. 12. Details are not described herein again.

In this embodiment, the connection between other member instances and the connection between another member instance and the composite NS instance that are mentioned in step 18 are network connections related to a non-nested NS instance. For example, in the examples in FIG. 13, the connection between other member instances includes a connection between the VNF #2 and a SAP #5.2 that is of the composite NS instance and that is connected to the VNF #2 at an external connection point VnfExtCP #2.2 of the VNF #2 through a VL #9. The example is merely used to explain this application, and shall not constitute a limitation. Optionally, the NFVO-1 may create a network connection between other instances using a virtual link information model already defined in the existing ETSI NFV standard. Details are not described herein again.

Embodiment 2

Figure 15:
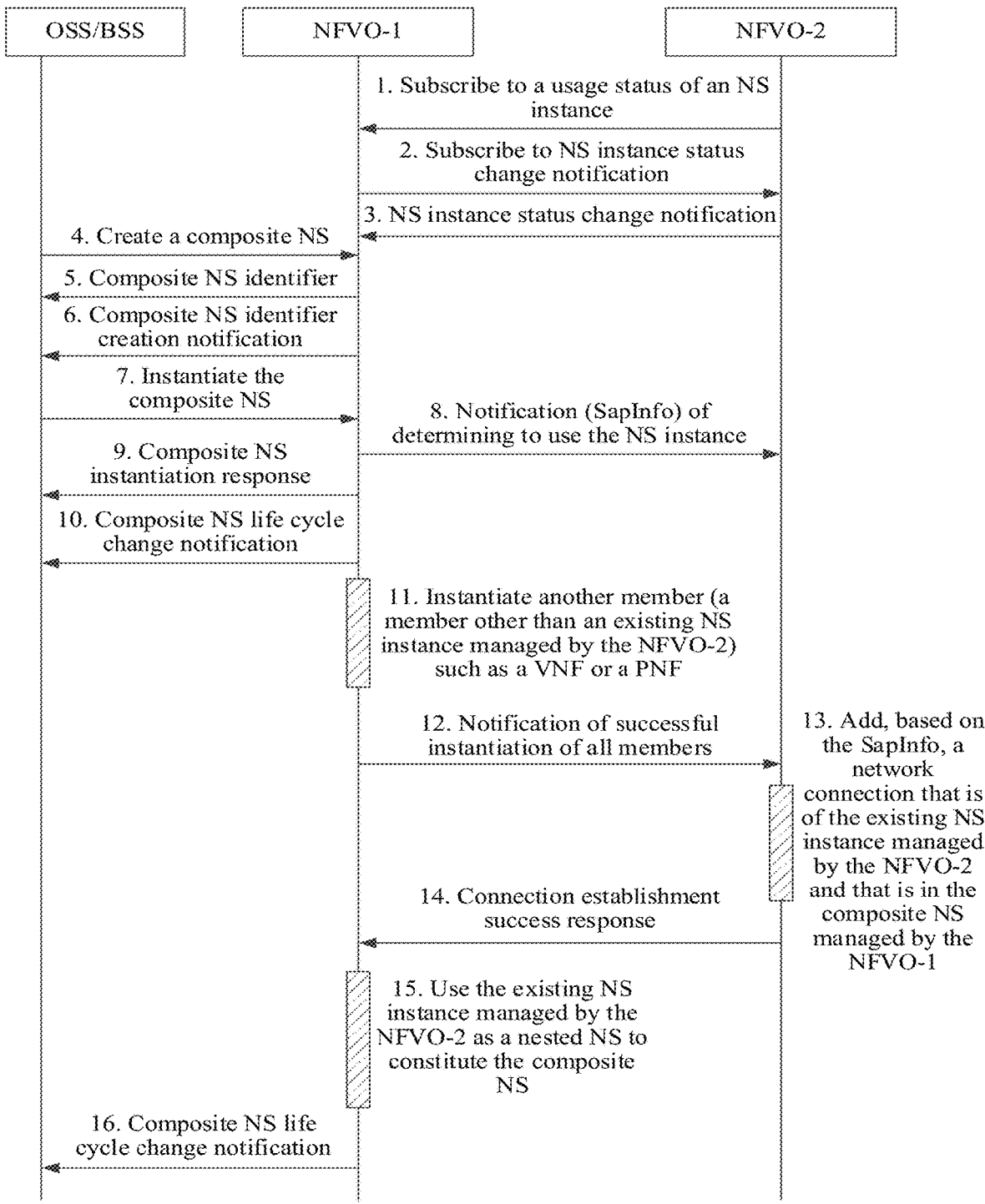
FIG. 15 is a schematic flowchart of implementing a network service management method in another application scenario according to this application.

FIG. 15 provides a variant scenario of instantiating a composite NS. In this scenario, a nested NS instance in an instantiated composite NS instance is an existing nested NS instance used by another composite NS instance. Therefore, the nested NS instance is shared by a plurality of composite NS instances, and the plurality of composite instances may be provided in different administrative domains.

Assumptions in the embodiment in FIG. 15 are as follows.
 a. A mapping relationship <nested NSD, NFVO-2> is available for the NFVO-1.
 b. There is an existing nested NS instance that is managed by the NFVO-2 and that can be directly used to instantiate a composite NS.
 c. The NFVO-1 determines whether to use the existing nested NS instance to constitute the composite NS.

With the assistance of the mapping relationship <nested NSD, NFVO-2>, the NFVO-1 may subscribe to a notification from the NFVO-2, where the notification is used to capture, in an administrative domain in which the NFVO-2 is located, a status change of a nested NS instance associated with the nested NSD. A state of the nested NS instance may include: being created but not instantiated, being instantiated but not shared, being instantiated and shared, or the like. The NFVO-1 may further uses information about a state (for example, being instantiated and shared) of the nested NS instance to instantiate the composite NS, for example, determine whether the nested NS instance may be used for a new composite NS.

A process shown in FIG. 15 may be detailed as follows.
 1. The NFVO-2 subscribes to notifications that are of usage statuses of NS instances and that are from all related NFVOs (including the NFVO-1). The related NFVO interacts with the NFVO-2 through an Or-Or reference point.

Herein, a manner in which an NFVO (for example, the NFVO-2 in this embodiment) selects a group of NFVOs (the NFVO needs to subscribe to notifications provided by the group of NFVOs) depends on a specific scenario. For example, in a proper manner, the NFVO may subscribe to a notification provided by each of other known NFVOs.
 2. The NFVO-1 subscribes to a notification from the NFVO-2, to learn of a status change of an NS instance (which is associated with an NSD or is directly indicated by the NFVO-1) in the administrative domain in which the NFVO-2 is located. A state of the NS instance may include: being created but not instantiated, being instantiated but not shared, being instantiated and shared, or the like.

3. When a corresponding event occurs, the NFVO-2 sends an NS instance status change notification to the NFVO-1, where the notification may carry an identifier of the NS instance and a new state of the NS instance.

Steps 4 to 7 are the same as steps 1 to 4 in FIG. 14, and mainly describe a procedure in which a sender initiates a composite NS instantiation request to the NFVO-1.
 8. The NFVO-1 sends, to the NFVO-2, a notification of determining to use the NS instance, to indicate that the NFVO-1 determines, based on a state (for example, being instantiated and shared) of the existing NS instance and another limitation such as a capacity limitation of the NS instance, to use the existing NS instance managed by the NFVO-2 to instantiate the composite NS.

In response to the notification, the NFVO-2 may establish a use relationship between the existing NS instance and the NFVO-1.

It may be understood that when the NFVO-1 determines to use the existing NS instance managed by the NFVO-2 as a member NS instance, a SAP instance for the existing NS instance needs to be newly added in a composite NS managed by the NFVO-1. The newly added SAP instance may be used to establish a connection between the existing NS instance and a member instance in the composite NS managed by the NFVO-1, and therefore the existing NS instance becomes a member instance in the composite NS. In this embodiment, the notification of determining to use the NS instance may carry SapInfo associated with the newly added SAP instance, where the SapInfo is used by the NFVO-2 to establish a network connection that is based on the newly added SAP instance.
 9. The NFVO-1 returns a composite NS instantiation response to the sender. For implementation of this step, refer to clause 7.3.3 in the ETSI GS NFV-IFA013 protocol. Details are not described herein again.
 10. The NFVO-1 obtains a composite NSD used for instantiating the composite NS, and sends, to the sender, a composite NS life cycle change notification that indicates a "start of instantiation". For implementation of this step, refer to clause 8.3.2.2 in the ETSI GS NFV-IFA013 protocol. Details are not described herein again.
 11. The NFVO-1 instantiates another member, such as a VNF or a PNF.
 12. As soon as all members of the composite NS instance are successfully instantiated, the NFVO-1 sends a notification to the NFVO-2, to notify the NFVO-2 that all member instances are successfully instantiated.
 13. The NFVO-2 may establish, using the SapInfo, network connections that are of the existing NS instance and that are based on the newly added SAP instance in the composite NS managed by the NFVO-1. For example, the NFVO-2 may establish a connection between the existing NS instance and a member instance that is in the composite NS instance and that is (externally) connected to the existing NS instance through the newly added SAP instance, and a connection between the existing NS instance and a member instance that is in the existing NS instance and that is (internally) connected to the existing NS instance through the newly added SAP instance.
 14. The NFVO-2 returns a connection establishment success response to the NFVO-1, to indicate that the network connections that are of the existing NS instance and that are based on the newly added SAP instance in the composite NS managed by the NFVO-1 is successfully established.
 15. The NFVO-1 uses the existing NS instance managed by the NFVO-2 to constitute the composite NS instance.

16. The NFVO-1 sends, to the sender, a composite NS life cycle change notification that indicates a "result". For implementation of this step, refer to clause 8.3.2.2 in the ETSI GS NFV-IFA013 protocol. Details are not described herein again.

In this embodiment, the notification of determining to use the NS instance in step 8 carries the SapInfo, where the SapInfo may be used by the NFVO-2 to establish internal and external network connections that are based on the newly added SAP instance of the existing NS instance. In this application, the notification of determining to use the NS instance may be referred to as a third request.

In this embodiment, for step 13 for an implementation of establishing, by the second NFVO based on the SapInfo, connections indicated by a virtual link information model described by the SapInfo, refer to related content in the overall method procedure described in FIG. 12. Details are not described herein again.

Embodiment 3

Figure 16:
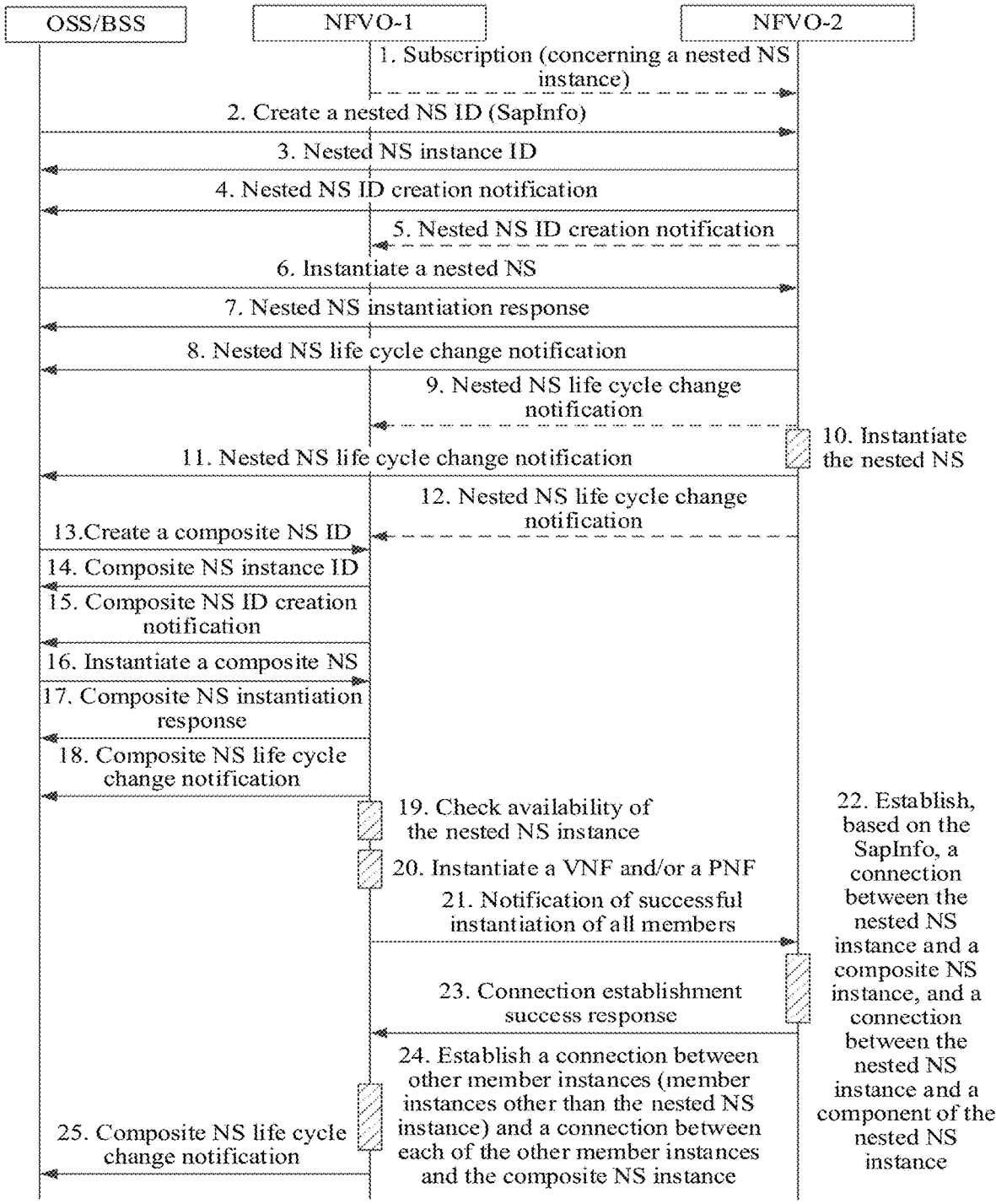
FIG. 16 is a schematic flowchart of implementing a network service management method in still another application scenario according to this application.

FIG. 16 shows a process of instantiating a composite NS using a bottom-up method. A sender (an OSS/BSS) first initiates instantiation for each nested NS before instantiation of the composite NS. This process mainly focuses on interaction performed through a reference point Or-Or.

Assumptions in the embodiment in FIG. 16 are as follows.

a. A mapping relationship <nested NSD, NFVO-2> is available for the NFVO-1.

b. No nested NS instance is shared by another composite NS.

A process shown in FIG. 16 may be detailed as follows.

1. The NFVO-1 subscribes to an NS life cycle change that is of a nested NS and that is generated by the NFVO-2. For implementation of this step, refer to clause 7.4 in the ETSI GS NFV-IFA013 protocol. Details are not described herein again.

2. The sender (for example, the OSS/BSS) sends, to the NFVO-2, a request used to create a nested NS ID. For implementation of this step, refer to clause 7.3.2 in the ETSI GS NFV-IFA013 protocol. Details are not described herein again. For example, the request may carry SapInfo. The SapInfo may be used by the NFVO-2 to establish internal and external network connections that are based on a SAP instance of a nested NS instance. For implementation of the SapInfo, refer to related foregoing descriptions. Details are not described herein again.

3. The NFVO-2 returns an ID of the nested NS instance to the sender. For implementation of this step, refer to clause 7.3.2 in the ETSI GS NFV-IFA013 protocol. Details are not described herein again.

4. The NFVO-2 sends a nested NS instance ID creation notification to the sender. For implementation of this step, refer to clause 8.3.2.9 in the ETSI GS NFV-IFA013 protocol. Details are not described herein again.

5. If the NFVO-1 already subscribes to the NS life cycle change (referring to step 1) that is of the nested NS and that is generated by the NFVO-2, the NFVO-2 notifies the NFVO-1 of nested NS instance ID creation.

6. The sender sends a nested NS instantiation request to the NFVO-2, where the request carries the ID of the nested NS instance. For implementation of this step, refer to clause 7.3.3 in the ETSI GS NFV-IFA013 protocol. Details are not described herein again.

7. The NFVO-2 returns a nested NS instantiation response to the sender. For implementation of this step, refer to clause 7.3.3 in the ETSI GS NFV-IFA013 protocol. Details are not described herein again.

8. The NFVO-2 sends, to the sender, a nested NS life cycle change notification that indicates a "start of instantiation". For implementation of this step, refer to clause 8.3.2.2 in the ETSI GS NFV-IFA013 protocol. Details are not described herein again.

9. If the NFVO-1 already subscribes to the NS life cycle change (referring to step 1) that is of the nested NS and that is generated by the NFVO-2, the NFVO-2 notifies the NFVO-1 of the nested NS life cycle change notification that indicates a "start of instantiation".

10. The NFVO-2 performs a process of instantiating the nested NS.

11. As soon as the nested NS instance is successfully instantiated, the NFVO-2 sends, to the sender, a nested NS life cycle change notification that indicates an "instantiation result". For implementation of this step, refer to clause 8.3.2.2 in the ETSI GS NFV-IFA013 protocol. Details are not described herein again.

12. If the NFVO-1 already subscribes to the NS life cycle change (referring to step 1) that is of the nested NS and that is generated by the NFVO-2, the NFVO-2 notifies the NFVO-1 of the nested NS instance life cycle change notification that indicates an "instantiation result".

13. As soon as all nested NS instances are successfully instantiated, the sender sends, to the NFVO-1, a request used to create a composite NS ID. For implementation of this step, refer to clause 7.3.2 in the ETSI GS NFV-IFA013 protocol. Details are not described herein again.

14. The NFVO-1 returns an ID of a composite NS instance to the sender. For implementation of this step, refer to clause 7.3.2 in the ETSI GS NFV-IFA013 protocol. Details are not described herein again.

15. The NFVO-1 sends a composite NS ID creation notification to the sender. For implementation of this step, refer to clause 8.3.2.9 in the ETSI GS NFV-IFA013 protocol. Details are not described herein again.

16. The sender sends a composite NS instantiation request to the NFVO-1, where the request carries the ID of the nested NS instance. For implementation of this step, refer to clause 7.3.3 in the ETSI GS NFV-IFA013 protocol. Details are not described herein again.

17. The NFVO-1 returns a composite NS instantiation response to the sender. For implementation of this step, refer to clause 7.3.3 in the ETSI GS NFV-IFA013 protocol. Details are not described herein again.

18. The NFVO-1 sends, to the sender, a composite NS life cycle change notification that indicates a "start of instantiation". For implementation of this step, refer to clause 8.3.2.2 in the ETSI GS NFV-IFA013 protocol. Details are not described herein again.

19. The NFVO-1 checks availability of a required nested NS instance based on the notification in step 11.

20. If the composite NS includes a VNF and/or a PNF, the NFVO-1 instantiates the VNF and/or the PNF.

21. As soon as all members of the composite NS instance are successfully instantiated, the NFVO-1 sends a notification to the NFVO-2, to notify the NFVO-2 that all member instances are successfully instantiated.

22. The NFVO-2 establishes, based on the SapInfo, a connection between the nested NS instance and a member instance that is in the composite NS instance and that is (externally) connected to the nested instance through the SAP instance, and a connection between the nested NS instance and a member instance that is in the nested NS instance and that is (internally) connected to the nested NS instance through the SAP instance.

23. The NFVO-2 returns a connection establishment success response to the NFVO-1, to indicate that the internal and external network connections, formed through the SAP instance, of the nested NS instance are successfully established.

24. As soon as all members in the composite NS instance are successfully instantiated, the NFVO-1 establishes a connection between other member instances (member instances other than the nested NS instance) and a connection between each of the other member instances and the composite NS instance.

25. The NFVO-1 sends, to the sender, a composite NS life cycle change notification that indicates a "result". For implementation of this step, refer to clause 8.3.2.2 in the ETSI GS NFV-IFA013 protocol. Details are not described herein again.

In this embodiment, the request used to create the nested NS ID in step 2 carries the SapInfo, and is equivalent to the first request mentioned in the method procedure in FIG. 12. The SapInfo may be used by the NFVO-2 to establish the internal and external network connections that are based on the SAP instance of the nested NS instance. Optionally, the SapInfo may alternatively be carried in the nested NS instantiation request in step 6. In this case, the nested NS instantiation request may be equivalent to the first request mentioned in the method procedure in FIG. 12.

In this embodiment, for step 22 for an implementation of establishing, by the second NFVO based on the SapInfo, connections indicated by a virtual link information model described by the SapInfo, refer to related content in the overall method procedure described in FIG. 12. Details are not described herein again.

Embodiment 4

Figure 17:
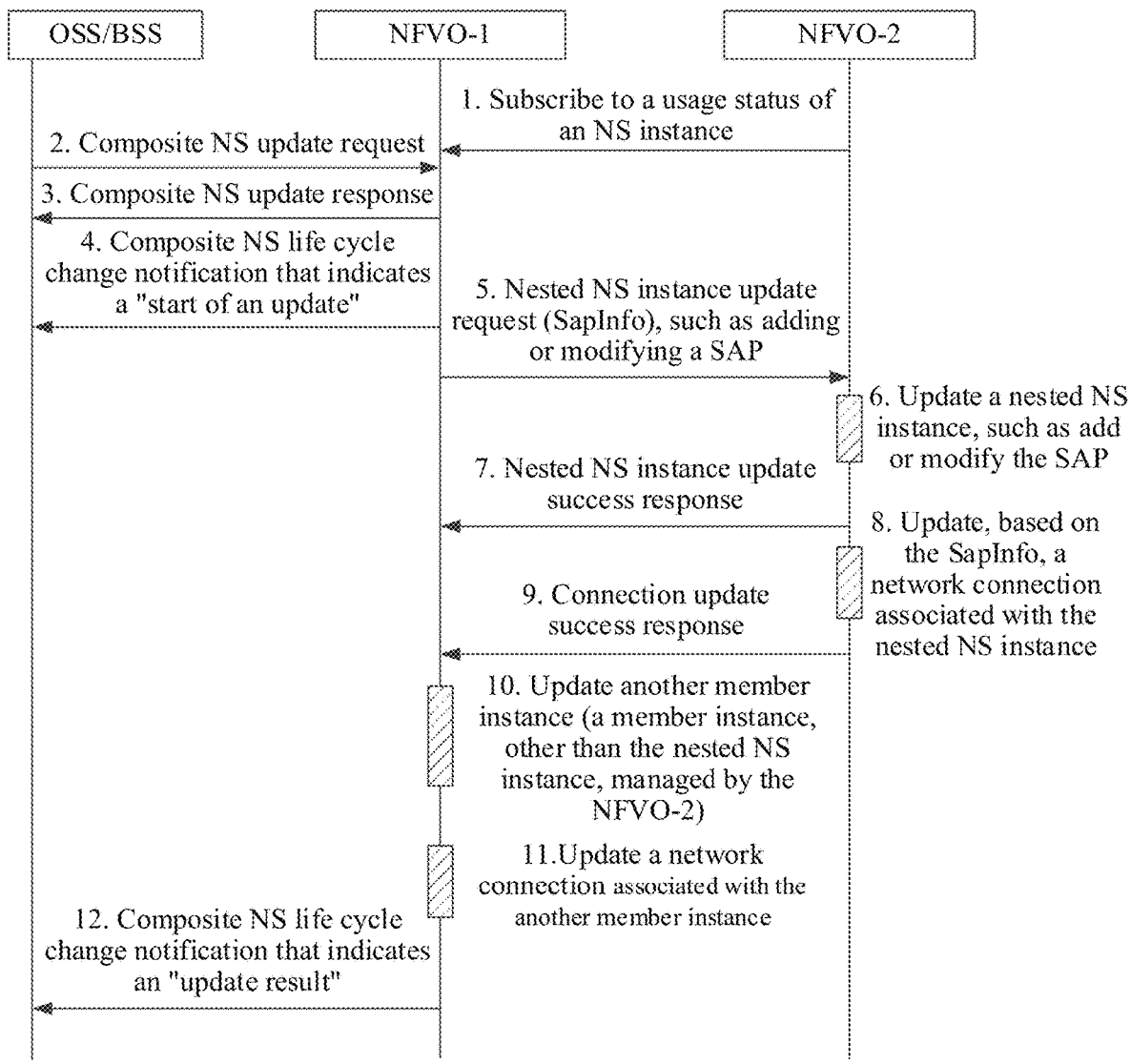
FIG. 17 is a schematic flowchart of implementing a network service management method in yet another application scenario according to this application.

FIG. 17 shows a process of updating a composite NS. A composite NS managed by the NFVO-1 includes a nested NS managed by the NFVO-2. This process mainly focuses on interaction performed through a reference point Or-Or.

An NS update type associated with a nested NS instance may include but is not limited to: adding a SAP for the nested NS, modifying a SAP of the nested NS, removing a SAP of the nested NS, adding a nested NS, or removing a nested NS. This embodiment mainly focuses on adding, modifying, or removing a SAP of the nested NS.

A process shown in FIG. 17 may be detailed as follows.

1. The NFVO-2 subscribes to notifications that are of usage statuses of NS instances and that are from all related NFVOs (including the NFVO-1). The related NFVO interacts with the NFVO-2 through an Or-Or reference point.

Herein, a manner in which an NFVO (for example, the NFVO-2 in this embodiment) selects a group of NFVOs (the NFVO needs to subscribe to notifications provided by the group of NFVOs) depends on a specific scenario. For example, in a proper manner, the NFVO may subscribe to a notification provided by each of other known NFVOs.

2. A sender (for example, an OSS/BSS) sends, to the NFVO-1, a composite NS update request used to perform an NS update operation. For implementation of this step, refer to clause 7.3.5 in the ETSI GS NFV-IFA013 protocol. Details are not described herein again.

3. The NFVO-1 returns an NS update response to the sender.

4. The NFVO-1 sends, to the sender, a composite NS life cycle change notification that indicates a "start of an update". For implementation of this step, refer to clause 8.3.2.2 in the ETSI GS NFV-IFA013 protocol. Details are not described herein again.

5. The NFVO-1 sends a nested NS instance update request to the NFVO-2, where the request carries SapInfo. The request may further include an NS update type, for example, adding a service access point or modifying a service access point.

For example, the SapInfo may be information about all SAP instances managed by the nested NS instance, or may be information about an added SAP instance, information about a to-be-modified SAP instance, or information about a to-be-removed SAP instance. The SapInfo may be used by the NFVO-2 to update a network connection associated with the nested NS instance. For implementation of the SapInfo, refer to related descriptions in the method procedure in FIG. 12. Details are not described herein again.

6. The NFVO-2 updates the nested NS instance. For example, the NFVO-2 may update the NS instance based on an NS update type, for example, add or modify a SAP instance.

7. The NFVO-2 returns a nested NS instance update success response to the NFVO-1.

8. The NFVO-2 updates, based on the SapInfo, the network connection associated with the nested NS instance. For example, the updating a network connection associated with the nested NS instance may include at least one of the following: establishing a new network connection associated with the nested NS instance, modifying an existing network connection associated with the nested NS instance, or removing an existing network connection associated with the nested NS instance.

9. The NFVO-2 returns a connection update success response to the NFVO-1.

10. The NFVO-1 updates another member instance (a member instance, other than the nested NS instance, managed by the NFVO-2).

11. The NFVO-1 updates a network connection associated with the other member instance.

12. The NFVO-1 sends, to the sender, a composite NS life cycle change notification that indicates an "update result". For implementation of this step, refer to clause 8.3.2.2 in the ETSI GS NFV-IFA013 protocol. Details are not described herein again.

In this embodiment, the nested NS instance update request in step 5 carries the SapInfo, and is equivalent to the second request mentioned in the method procedure in FIG. 12.

In this embodiment, for step 8 for an implementation of updating, by the second NFVO based on the SapInfo, the network connection associated with the nested NS instance, refer to related content in the overall method procedure described in FIG. 12. Details are not described herein again.

Figure 18:
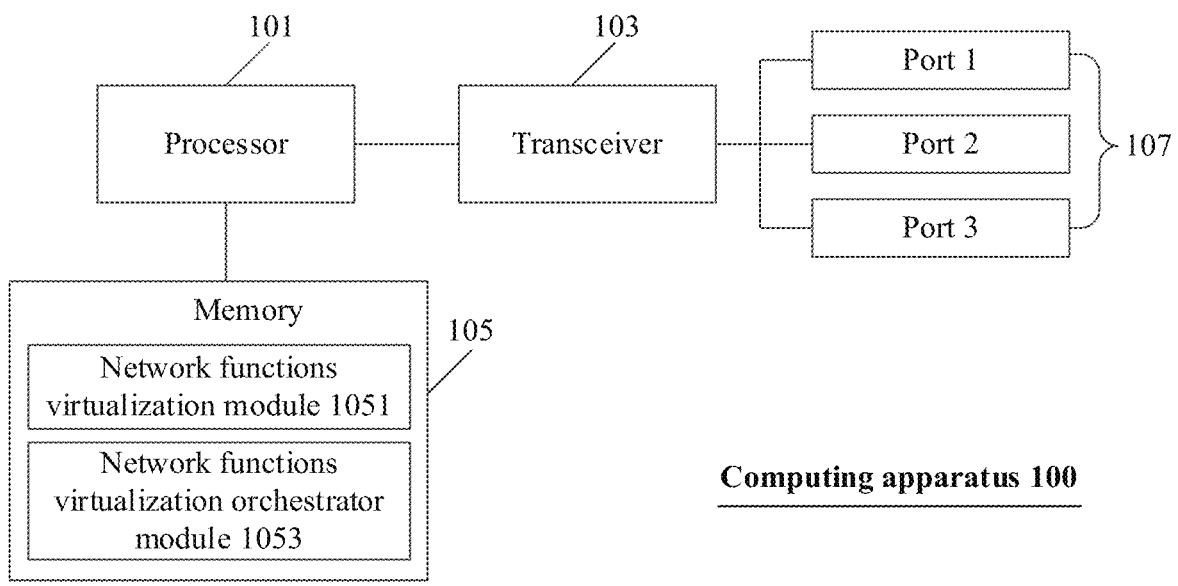
FIG. 18 is a schematic diagram of a structure of a network element according to this application.

FIG. 18 shows an apparatus 100 provided in this application. The apparatus 100 may be applied in the NFV MANO system shown in FIG. 2. The apparatus 100 may be mainly configured to implement a function of an NFVO. To be more specific, the apparatus 100 mainly manages and processes a network service descriptor (NSD) and a virtualized network function forwarding graph (VNFFG), and performs life cycle management for a network service. Optionally, the apparatus 100 may further integrate a function of a VNFM, and may be further configured to perform life cycle management for a VNF and implement a global view function for virtualized resources. Optionally, the apparatus 100 may further integrate a function of a VIM, and may be further configured to perform resource allocation and/or reservation and exchange configuration and status information of a virtualized resource.

As shown in FIG. 18, the apparatus 100 may include a transceiver 103, one or more ports 107 coupled to the transceiver 103, a memory 105, and a processor 101 coupled to the memory 105.

The transceiver 103 may be a transmitter, a receiver, or a combination thereof, and send or receive data through the port 107.

The memory 105 is coupled to the processor 101, and is configured to store various software programs and/or a plurality of sets of instructions. For example, the memory 105 may be a high-speed random access memory 105, and may further be a nonvolatile memory 105, for example, one or more disk storage devices, a flash memory device, or another nonvolatile solid-state storage device. The memory 105 may store an operating system (briefly referred to as a system below), for example, an embedded operating system such as uCOS, VxWorks, or RTLinux.

In this application, the memory 105 may store an implementation program, namely, an NFVO module 1053, of the network service management method provided in one or more embodiments of this application. The NFVO module 1053 may be executed on the processor 101. When the NFVO module 1053 is executed, the processor 101 may be configured to perform the network service management method provided in this application.

Optionally, the memory 105 may further store an NFV module 1051. The NFV module 1051 may be configured to host, store, and implement a network function of one or more virtualized network devices.

The processor 101 may include one or more multi-core processors 101 and/or the memory 105. The processor 101 may be a general-purpose processor 101, an application-specific integrated circuit (ASIC), a digital signal processor 101 (DSP), or a system on chip (SoC). The processor 101 is coupled to the transceiver 103, and may be configured to process data received or sent by the transceiver 103. The processor 101 may be configured to read and execute a computer-readable instruction. For example, the processor 101 may be configured to: invoke a program stored in the memory 105 (such as an implementation program of the network service management method provided in one or more embodiments of this application), and execute an instruction included in the program.

In this application, the apparatus 100 shown in FIG. 18 may be configured to run the consumer NFVO (that is, the first NFVO or the NFVO-1) mentioned in the foregoing method embodiments, or may be configured to run the provider NFVO (that is, the second NFVO or the NFVO-2) mentioned in the foregoing method embodiments.

For example, the apparatus 100 may be implemented as a computing apparatus such as a router, a server, or a switch.

It should be noted that the apparatus 100 shown in FIG. 18 is only an implementation of the embodiments of this application. In actual application, the apparatus 100 may further include more or fewer components, and this is not limited herein.

Figure 19:
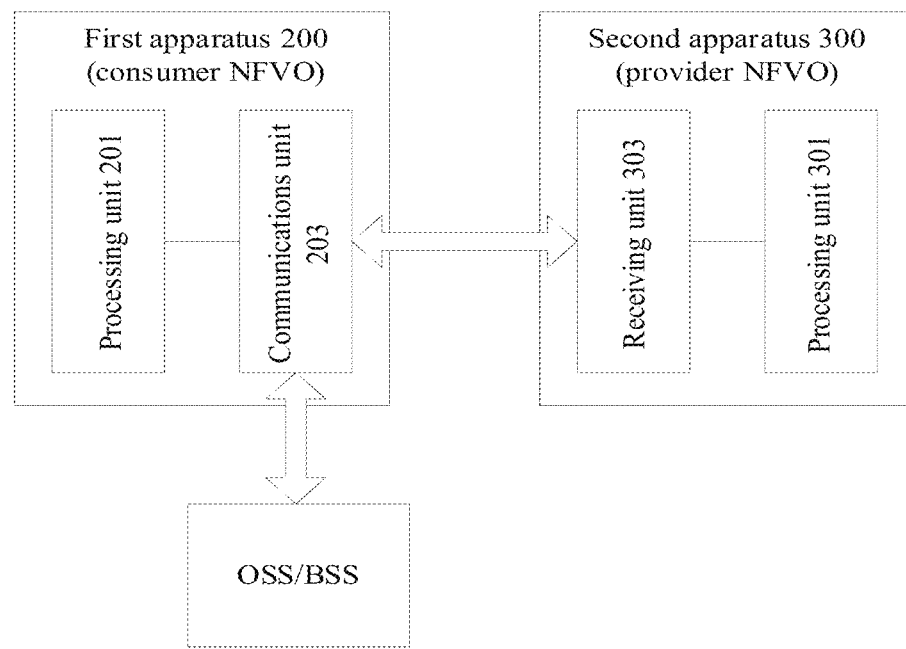
FIG. 19 is a functional block diagram of an NFV MANO system and a related apparatus according to this application.

FIG. 19 shows an NFV MANO system and an apparatus provided in this application.

An NFV MANO system 10 may include a first apparatus 200 and a second apparatus 300. In this application, the first apparatus 200 may be the consumer NFVO (that is, the first NFVO or the NFVO-1) mentioned in the foregoing method embodiments, and the second apparatus 300 may be the provider NFVO (that is, the second NFVO or the NFVO-2) mentioned in the foregoing method embodiments. The NFV MANO system 10 may be the NFV MANO system described in FIG. 2. Descriptions are separately provided below.

As shown in FIG. 19, the first apparatus 200 may include a processing unit 201 and a communications unit 203.

The communications unit 203 may be configured to receive a request that is used to create a composite NS instance and that is sent by a sender (for example, an OSS/BSS).

The communications unit 203 may be configured to send a first request to the second apparatus 300 (that is, the provider NFVO), where the first request is used to request the second apparatus 300 to create a nested NS instance in the composite NS instance.

The processing unit 201 may be configured to: create a member instance (that is, another member instance) other than the nested NS instance in the composite NS instance; and establish a network connection between member instances.

For example, the first request carries information about a SAP instance associated with the nested NS instance. The information about the SAP instance may be used by the second apparatus 300 to establish, based on the SAP instance, a connection between the nested NS instance and the composite NS instance and a connection between the nested NS instance and the member instance in the composite NS instance, and is further used by the second apparatus 300 to establish, based on the SAP instance, a connection relationship to a member instance in the nested NS instance.

In this application, the member instance in the composite NS instance may include at least one nested NS instance, and the member instance in the nested NS instance may include at least one of the following: a nested NS instance, a VNF instance, or a PNF instance.

In this application, the information about the SAP instance may include first information and second information. The first information may be used by the second apparatus 300 to establish, based on the SAP instance, a connection relationship in which the nested NS instance is connected to the member instance in the composite NS instance through the SAP instance. The second information may be used by the second apparatus 300 to establish, based on the SAP instance, a connection relationship in which the nested NS instance is connected to the member instance in the nested NS instance through the SAP instance. For implementation of the SapInfo, refer to related descriptions in the foregoing method embodiments. Details are not described herein again.

In some embodiments, the communications unit 203 may be further configured to receive a request that is used to update the composite NS instance and that is sent by the sender (for example, the OSS/BSS). The communications unit 203 may be further configured to send a second request to the second apparatus 300, where the second request may be used to request to update the nested NS instance in the composite NS instance. For example, the second request carries the information about the SAP instance associated with the nested NS instance, and the information about the SAP instance may be used by the second apparatus 300 to update, based on the SAP instance, a network connection that is associated with the nested NS instance and that is in the composite NS instance. Optionally, the processing unit 201 may be further configured to: update the member instance (that is, the other member instance) other than the nested NS instance in the composite NS instance, and update the network connection between member instances.

In some embodiments, after receiving the request that is used to create the composite NS instance and that is sent by the sender, the communications unit 203 may be further configured to send a third request to the second apparatus 300, where the third request may be used to request to use an existing nested NS instance managed by the second apparatus 300 to constitute a composite NS instance. For example, the third request carries information about a SAP instance that is of the existing nested NS instance and that is newly added in the composite NS instance managed by the first apparatus 200. The information about the newly added SAP instance may be used by the second apparatus 300 to establish, based on the newly added SAP instance, a network connection that is of the existing nested NS instance and that is in the composite NS instance.

It may be understood that for implementation of functional units included in the first apparatus 200, refer to the foregoing method embodiments. Details are not described herein again.

As shown in FIG. 19, the second apparatus 300 may include a processing unit 301 and a receiving unit 303.

The receiving unit 303 may be configured to receive the first request sent by the first apparatus 200 (that is, the consumer NFVO). For example, the first request carries the information about the SAP instance associated with the nested NS instance, and is used to request the second apparatus 300 to establish the nested NS instance in the composite NS instance.

The processing unit 301 may be configured to establish, based on the SAP instance and the information about the SAP instance, the connection between the nested NS instance and the composite NS instance and the connection between the nested NS instance and the member instance in the composite NS instance, and establish, based on the SAP instance and the information about the SAP instance, the connection relationship to the member instance in the nested NS instance.

In this application, the member instance in the composite NS instance may include at least one nested NS instance, and the member instance in the nested NS instance may include at least one of the following: a nested NS instance, a VNF instance, or a PNF instance.

In this application, the information about the SAP instance may include the first information and the second information. The first information may be used by the second apparatus 300 to establish, based on the SAP instance, the connection relationship in which the nested NS instance is connected to the member instance in the composite NS instance through the SAP instance. The second information may be used by the second apparatus 300 to establish, based on the SAP instance, the connection relationship in which the nested NS instance is connected to the member instance in the nested NS instance through the SAP instance. For implementation of the SapInfo, refer to related descriptions in the foregoing method embodiments. Details are not described herein again.

In some embodiments, the communications unit may be further configured to receive the second request sent by the first apparatus 200, where the second request may be used to request to update the nested NS instance in the composite NS instance. For example, the second request carries the information about the SAP instance associated with the nested NS instance, and the information about the SAP instance may be used by the second apparatus 300 to update, based on the SAP instance, the network connection that is associated with the nested NS instance and that is in the composite NS instance. Correspondingly, the processing unit 301 may be further configured to update, based on the SAP instance and the information about the SAP instance, the network connection that is associated with the nested NS instance and that is in the composite NS instance.

In some embodiments, the communications unit may be further configured to receive the third request sent by the first apparatus 200, where the third request may be used to request to use the existing nested NS instance managed by the second apparatus 300. For example, the third request carries the information about the SAP instance that is of the existing nested NS instance and that is newly added in the composite NS instance managed by the first apparatus 200. The information about the newly added SAP instance may be used by the second apparatus 300 to establish, based on the newly added SAP instance, the network connection that is of the existing nested NS instance and that is in the composite NS instance. Correspondingly, the processing unit 301 may be further configured to establish, based on the newly added SAP instance and the information about the newly added SAP instance, the network connection that is of the existing nested NS instance and that is in the composite NS instance.

It may be understood that for implementation of functional units included in the second apparatus 300, refer to the foregoing method embodiments. Details are not described herein again.

In conclusion, by implementing of the technical solutions provided in this application, the SapInfo is carried in a request (namely, the first request) used to create the nested NS instance, and the provider NFVO may be indicated to establish external and internal network connections of the nested NS instance based on the SapInfo from the perspective of the nested NS instance. This can meet a requirement for establishing a network connection from the perspective of a nested NS. In addition, the SapInfo is carried in a request (namely, the second request) used to update the nested NS instance, and the provider NFVO may be indicated to update external and internal network connections of the nested NS instance based on the SapInfo from the perspective of the nested NS instance. This can better meet a requirement for updating a network connection from the perspective of the nested NS.

A person of ordinary skill in the art may understand that all or some of the processes of the methods in the embodiments may be implemented by a computer program instructing relevant hardware. The program may be stored in a computer-readable storage medium. When the program is run, the processes of the methods in the embodiments may be performed. The foregoing storage medium includes any medium that can store program code, such as a read-only memory (ROM), a random access memory (RAM), a magnetic disk, or an optical disc.

What is claimed is:

1. A network service management method performed by a second network functions virtualization orchestrator (NFVO), comprising:
    receiving a first request from a first NFVO, wherein the first request requests creating a nested network service instance in a composite network service instance, and wherein the first request carries information about a service access point instance associated with the nested network service instance;
    instantiating the nested network service instance in response to receiving the first request;

establishing, based on the service access point instance and the information about the service access point instance, a first connection between the nested network service instance and the composite network service instance and a second connection between the nested network service instance and a first member instance in the composite network service instance; and establishing, based on the service access point instance and the information about the service access point instance, a network connection between the nested network service instance and a second member instance in the nested network service instance.

2. The network service management method according to claim 1, wherein the information about the service access point instance comprises first information and second information, wherein the first information is for the second NFVO to establish the first connection and the second connection based on the service access point instance, and wherein the second information is for the second NFVO to establish the network connection between the second member instance and the nested network service instance based on the service access point instance.

3. The network service management method according to claim 2, wherein the first information comprises an identifier of a first virtual link instance, an identifier of a port through which the service access point instance is connected to the first virtual link instance, and an identifier of a peer connection point connected to the service access point instance through the first virtual link instance, wherein the first virtual link instance is to externally connect the nested network service instance to the first member instance based on the service access point instance, and wherein the peer connection point is an external connection point that is of the first member instance and that is connected to the service access point instance through the first virtual link instance.

4. The network service management method according to claim 3, wherein the first member instance comprises at least one of another nested network service instance, a virtualized network function instance, or a physical network function instance, and wherein establishing the first connection and the second connection comprises at least one of:

establishing, based on the service access point instance and the first information, a connection between the service access point instance and another service access point instance that is of the composite network service instance and that is externally connected to the service access point instance through the first virtual link instance;

establishing, based on the service access point instance and the first information, a connection between the service access point instance and another service access point instance that is of the nested network service instance and that is externally connected to the service access point instance through the first virtual link instance;

establishing, based on the service access point instance and the first information, a connection between the service access point instance and another external connection point that is of the virtualized network function instance and that is externally connected to the service access point instance through the first virtual link instance; or establishing, based on the service access point instance and the first information, a connection between the service access point instance and another external connection point that is of the physical network function instance and that is externally connected to the service access point instance through the first virtual link instance.

5. The network service management method according to claim 2, wherein the second information comprises at least one of:

an identifier of a second virtual link instance and a port through which the service access point instance is connected to the second virtual link instance; or the identifier of the second virtual link instance, the port, and an identifier of a peer connection point connected to the service access point instance through the second virtual link instance, wherein the peer connection point is an external connection point that is of the second member instance and that is connected to the service access point instance through the second virtual link instance, and wherein the second virtual link instance is to internally connect the nested network service instance to the second member instance based on the service access point instance.

6. The network service management method according to claim 5, wherein the second member instance comprises at least one of a sub-nested network service instance, a virtualized network function instance, or a physical network function instance, and wherein establishing the network connection between the nested network service instance and the second member instance comprises at least one of:

establishing, based on the service access point instance and the second information, a connection between the service access point instance and another service access point instance that is of the sub-nested network service instance and that is internally connected to the service access point instance through the second virtual link instance;

establishing, based on the service access point instance and the second information, a connection between the service access point instance and another external connection point that is of the virtualized network function instance and that is internally connected to the service access point instance through the second virtual link instance; or establishing, based on the service access point instance and the second information, a connection between the service access point instance and another external connection point that is of the physical network function instance and that is internally connected to the service access point instance through the second virtual link instance.

7. The network service management method according to claim 1, further comprising:

receiving, a second request from the first NFVO, wherein the second request requests updating the nested network service instance, and wherein the second request carries the information about the service access point instance associated with the nested network service instance; and updating, by the second NFVO after receiving the second request, a second network connection based on the service access point instance and the information about the service access point instance, wherein the second network connection is associated with the nested network service instance and is in the composite network service instance.

8. The network service management method according to claim 1, further comprising:

receiving, a third request from the first NFVO, wherein the third request requests using an existing nested network service instance managed by the second NFVO, and wherein the third request carries third information about a new service access point instance that is of the existing nested network service instance and that is newly added in the composite network service instance managed by the first NFVO; and establishing, by the second NFVO based on the new service access point instance and the third information, a third network connection that is of the existing nested network service instance and that is in the composite network service instance.

9. An apparatus, comprising:

a memory configured to store instructions;

a processor coupled to the memory and configured to execute the instructions to cause the apparatus to:

receive a first request from a first network functions virtualization orchestrator (NFVO), wherein the first request requests creating a nested network service instance in a composite network service instance, and wherein the first request carries information about a service access point instance associated with the nested network service instance;

instantiate the nested network service instance in response to receiving the first request;

establish, based on the service access point instance and the information about the service access point instance, a first connection between the nested network service instance and the composite network service instance and a second connection between the nested network service instance and a first member instance in the composite network service instance; and establish, based on the service access point instance and the information about the service access point instance, a network connection between the nested network service instance and a second member instance in the nested network service instance.

10. The apparatus according to claim 9, wherein the information about the service access point instance comprises first information and second information, wherein the first information is for the apparatus to establish the first connection and the second connection based on the service access point instance, and wherein the second information is for the apparatus to establish the network connection between the second member instance and the nested network service instance based on the service access point instance.

11. The apparatus according to claim 10, wherein the first information comprises an identifier of a first virtual link instance, an identifier of a port through which the service access point instance is connected to the first virtual link instance, and an identifier of a peer connection point connected to the service access point instance through the first virtual link instance, wherein the first virtual link instance is to externally connect the nested network service instance to the first member instance based on the service access point instance, and wherein the peer connection point is an external connection point that is of the first member instance and that is connected to the service access point instance through the first virtual link instance.

12. The apparatus according to claim 10, wherein the second information comprises an identifier of a second virtual link instance and a port through which the service access point instance is connected to the second virtual link instance.

13. The apparatus according to claim 10, wherein the second information comprises an identifier of a second virtual link instance, a port through which the service access point instance is connected to the second virtual link instance, and an identifier of a peer connection point connected to the service access point instance through the second virtual link instance, wherein the peer connection point is an external connection point that is of the second member instance and that is connected to the service access point instance through the second virtual link instance, and wherein the second virtual link instance is to internally connect the nested network service instance to the second member instance based on the service access point instance.

14. A network service management system, comprising:

a first apparatus of a first network functions virtualization orchestrator (NFVO), the first apparatus comprising:

a first communication unit configured to send a first request, wherein the first request requests creating a nested network service instance in a composite network service instance, and wherein the first request carries information about a service access point instance associated with the nested network service instance; and a first processing unit coupled to the first communication unit; and a second apparatus of a second NFVO, the second apparatus comprising:

a second communication unit configured to: receive the first request from the first NFVO; and a second processing unit coupled to the second communication unit and configured to:

instantiate the nested network service instance after receiving the first request;

establish, based on the service access point instance and the information about the service access point instance, a first connection between the nested network service instance and the composite network service instance and a second connection between the nested network service instance and a first member instance in the composite network service instance; and establish, based on the service access point instance and the information about the service access point instance, a network connection between the nested network service instance and a second member instance in the nested network service instance.

15. The network service management system according to claim 14, wherein the information about the service access point instance comprises first information and second information.

16. The network service management system according to claim 15, wherein the first information is for the second NFVO to establish the first connection and the second connection based on the service access point instance.

17. The network service management system according to claim 16, wherein the second information is for the second NFVO to establish the network connection between the second member instance and the nested network service instance based on the service access point instance.

18. The network service management system according to claim 17, wherein the first information comprises an identifier of a first virtual link instance, an identifier of a port through which the service access point instance is connected to the first virtual link instance, and an identifier of a peer connection point connected to the service access point instance through the first virtual link instance.

19. The network service management system according to claim 18, wherein the first virtual link instance is to externally connect the nested network service instance to the first member instance based on the service access point instance.

20. The network service management system according to claim 19, wherein the peer connection point is an external connection point that is of the first member instance and that is connected to the service access point instance through the first virtual link instance.

* * * * *